(12) United States Patent
Goto et al.

(10) Patent No.: US 7,948,655 B2
(45) Date of Patent: May 24, 2011

(54) IMAGE PROCESSING APPARATUS, IMAGE PROCESSING METHOD, IMAGE PROCESSING PROGRAM, AND STORAGE MEDIUM

(75) Inventors: Fumitaka Goto, Ohta-ku (JP); Kentaro Yano, Yokohama (JP); Fumihiro Goto, Kawasaki (JP); Masao Kato, Kawasaki (JP); Akitoshi Yamada, Yokohama (JP); Tetsuya Suwa, Yokohama (JP); Mitsuhiro Ono, Koto-ku (JP); Arata Miyagi, Kawasaki (JP); Yusuke Hashii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 863 days.

(21) Appl. No.: 11/768,488

(22) Filed: Jun. 26, 2007

(65) Prior Publication Data
US 2008/0002998 A1   Jan. 3, 2008

(30) Foreign Application Priority Data
Jun. 29, 2006   (JP) .................................. 2006-180378

(51) Int. Cl.
*G06K 15/00*   (2006.01)
(52) U.S. Cl. .......... 358/2.1; 358/448; 358/466; 358/1.9; 358/3.03; 358/3.27; 382/254; 382/266
(58) Field of Classification Search .................. 358/448, 358/466, 1.9, 2.1, 3.03, 3.27; 382/176, 190, 382/192, 195, 199, 205, 254, 266; 348/222.1
See application file for complete search history.

(56) References Cited

U.S. PATENT DOCUMENTS

| | | | |
|---|---|---|---|
| 4,577,235 A | 3/1986 | Kannapell et al. | ............ 358/280 |
| 4,893,188 A | 1/1990 | Murakami et al. | ............ 358/456 |
| 5,045,952 A * | 9/1991 | Eschbach | ..................... 358/3.03 |
| 5,087,972 A | 2/1992 | Sumi | |
| 5,585,944 A | 12/1996 | Rodriguez | |
| 5,621,868 A | 4/1997 | Mizutani et al. | |

(Continued)

FOREIGN PATENT DOCUMENTS

EP   0 415 648 A2   3/1991

(Continued)

OTHER PUBLICATIONS

European Communication and Search Report dated Sep. 20, 2007, regarding Application No. 07011787.4-1522.

*Primary Examiner* — Kimberly A. Williams
(74) *Attorney, Agent, or Firm* — Fitzpatrick, Cella, Harper & Scinto

(57) ABSTRACT

There is disclosed an image processing apparatus which applies an adjusting process to an image that includes a pixel to be processed. The image processing apparatus extracts an image area with a predetermined size including the pixel to be processed. The apparatus calculates a variation associated with the pixel to be processed from signal values of pixels included in the image area. The apparatus calculates a variation time count in the image area from the signal values of the pixels included in the image area. The apparatus calculates adjusting levels Fz1, Fz2, and Fe from the variation time count and the variation using a definition unit which defines correspondence among the variation time count, the variation, and the adjusting levels, and applies an adjusting process to a signal value of the pixel to be processed by the calculated adjusting levels. Note that the definition unit defines the correspondence so that the adjusting levels Fz1, Fz2, and Fe progressively change in accordance with different variation time counts or different variations.

19 Claims, 36 Drawing Sheets

U.S. PATENT DOCUMENTS

| | | | |
|---|---|---|---|
| 5,701,364 A | 12/1997 | Kanno | |
| 5,914,731 A | 6/1999 | Yano et al. | 347/9 |
| 5,960,109 A | 9/1999 | Shiau | |
| 6,075,894 A | 6/2000 | Yano et al. | 382/199 |
| 6,191,874 B1 | 2/2001 | Yamada et al. | |
| 6,243,070 B1 | 6/2001 | Hill et al. | |
| 6,292,621 B1 | 9/2001 | Tanaka et al. | |
| 6,480,624 B1 | 11/2002 | Horie et al. | |
| 6,608,926 B1 | 8/2003 | Suwa et al. | |
| 6,636,644 B1 | 10/2003 | Itokawa | |
| 6,636,646 B1 | 10/2003 | Gindele | |
| 6,694,051 B1 | 2/2004 | Yamazoe et al. | |
| 6,714,689 B1 | 3/2004 | Yano et al. | 382/284 |
| 6,856,704 B1 | 2/2005 | Gallagher et al. | |
| 6,934,412 B2 | 8/2005 | Bares | |
| 7,075,679 B2 | 7/2006 | Goto et al. | |
| 7,274,491 B2 | 9/2007 | Yamada et al. | |
| 7,280,703 B2 | 10/2007 | Gallagher et al. | |
| 7,289,154 B2 | 10/2007 | Gindele | |
| 7,308,137 B2 | 12/2007 | Hsieh et al. | |
| 7,426,312 B2 | 9/2008 | Dance et al. | |
| 7,466,319 B1 | 12/2008 | Kirkland et al. | |
| 7,570,810 B2 | 8/2009 | Rai et al. | |
| 7,684,617 B2 | 3/2010 | Yoshiura | |
| 7,746,503 B2 * | 6/2010 | Lim | 358/3.27 |
| 2003/0160875 A1 | 8/2003 | Mitsunaga et al. | |
| 2003/0179299 A1 * | 9/2003 | Okada | 348/222.1 |
| 2004/0196408 A1 | 10/2004 | Ishikawa et al. | |
| 2005/0134892 A1 | 6/2005 | Goto et al. | |
| 2006/0012693 A1 * | 1/2006 | Sambongi | 348/241 |
| 2008/0002216 A1 * | 1/2008 | Matsushima | 358/1.9 |
| 2008/0002901 A1 | 1/2008 | Miyagi et al. | |
| 2008/0018938 A1 | 1/2008 | Lee | |
| 2008/0123150 A1 | 5/2008 | Ono et al. | |
| 2008/0123153 A1 | 5/2008 | Yamada et al. | |

FOREIGN PATENT DOCUMENTS

| | | |
|---|---|---|
| EP | 0 871 323 A2 | 10/1998 |
| EP | 0 898 414 A2 | 2/1999 |
| EP | 1 065 881 A1 | 1/2001 |
| JP | 2620368 | 3/1997 |
| JP | 3215768 | 10/2001 |
| JP | 2002-077623 | 3/2002 |

* cited by examiner

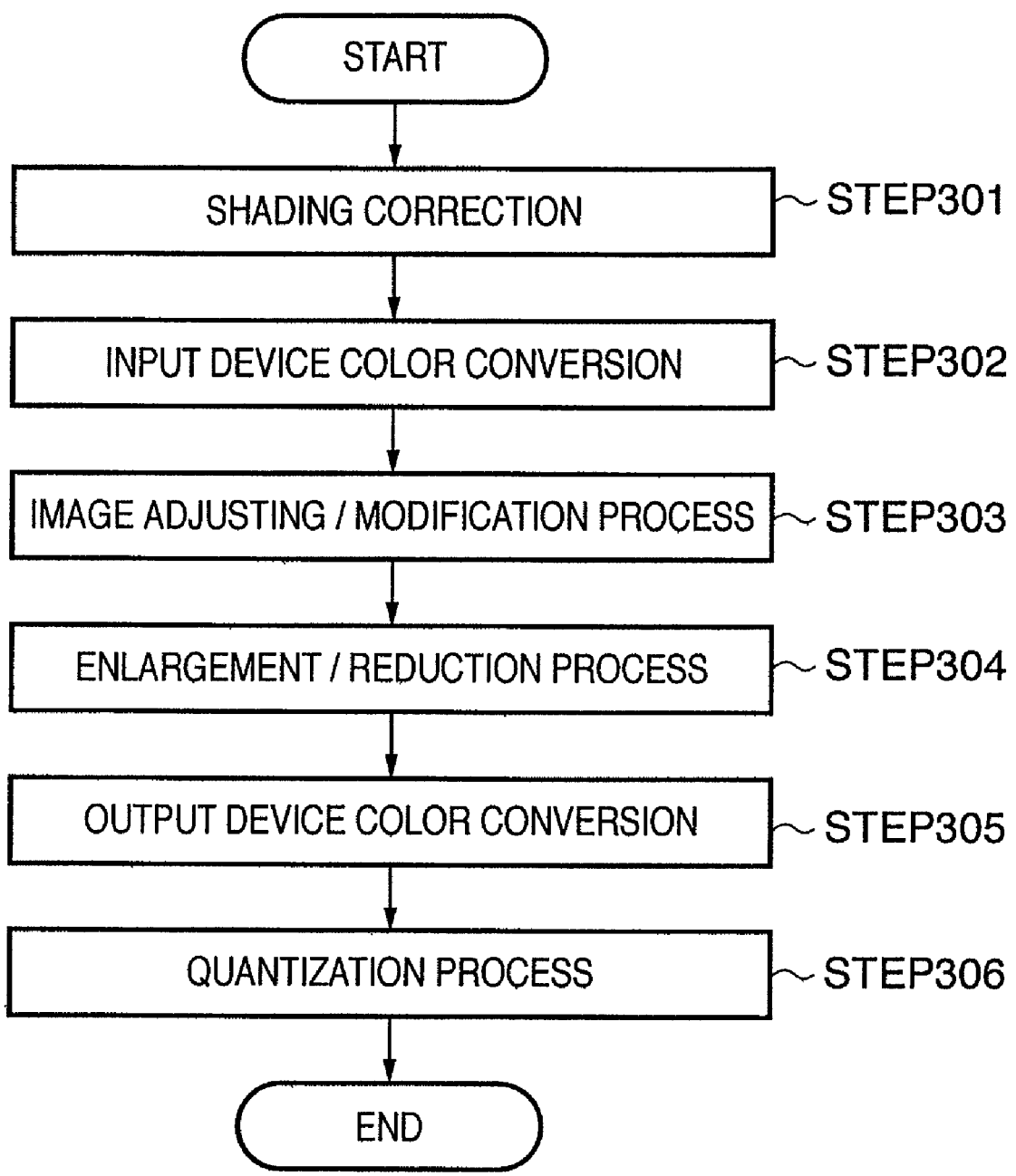

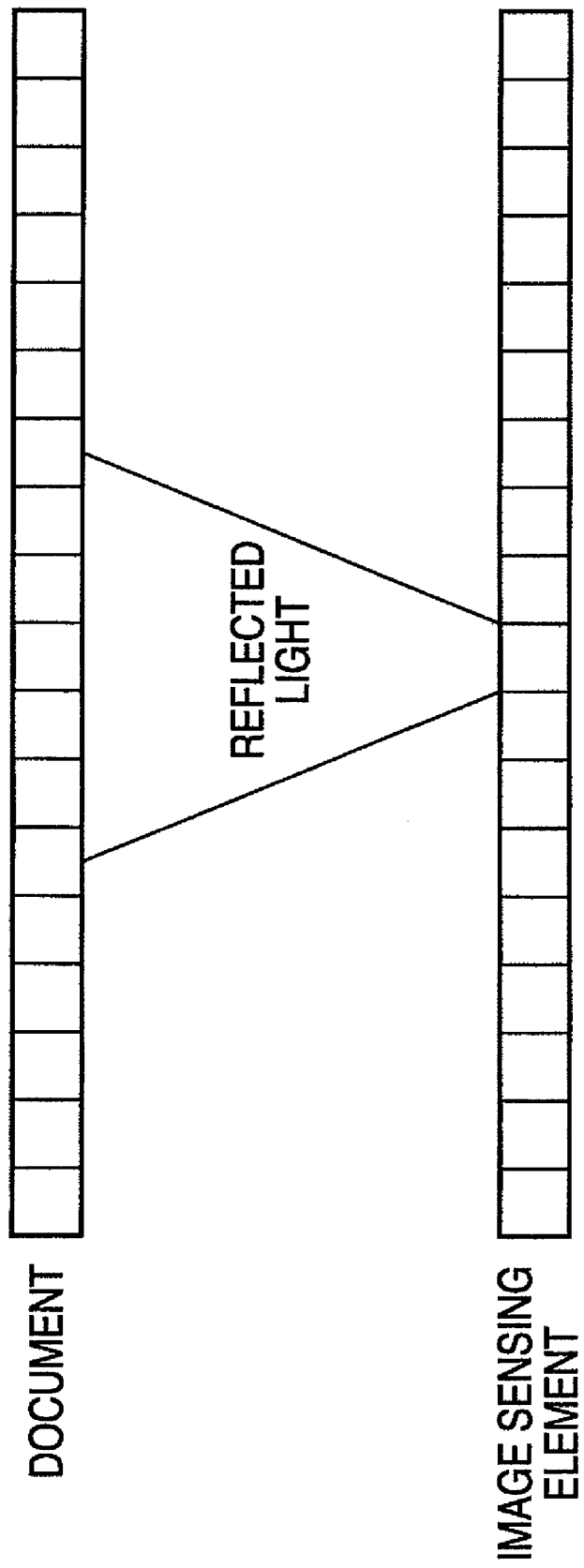

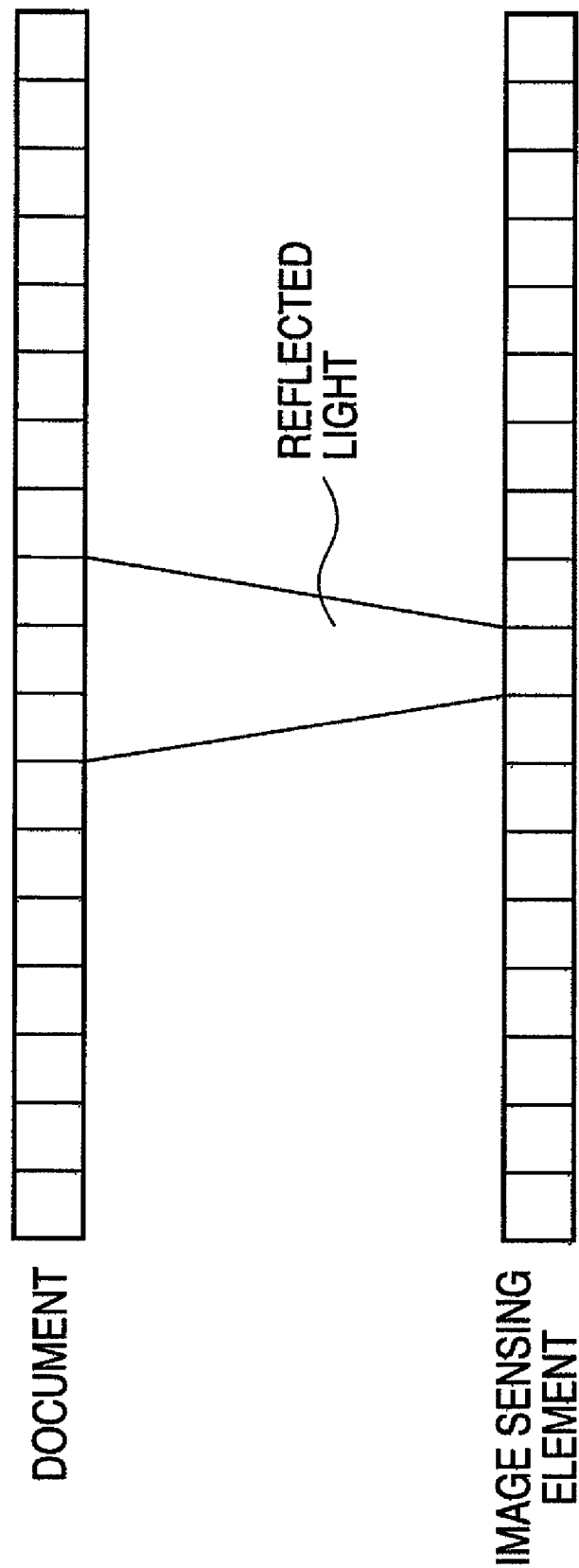

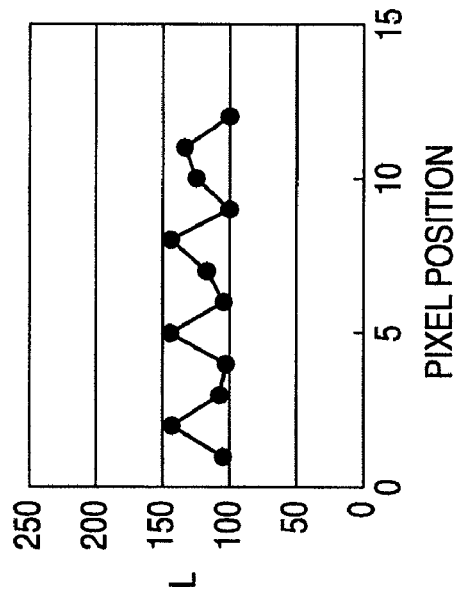
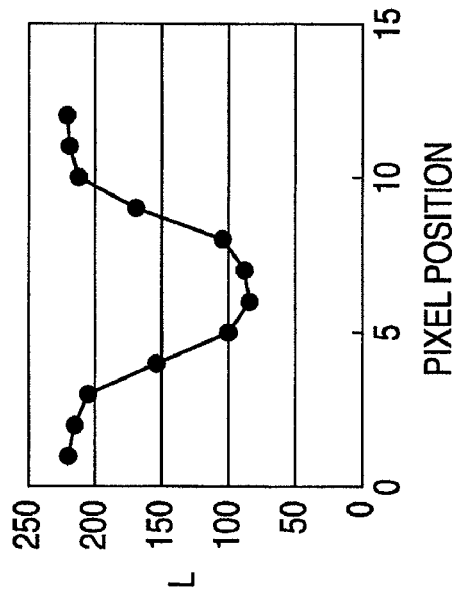
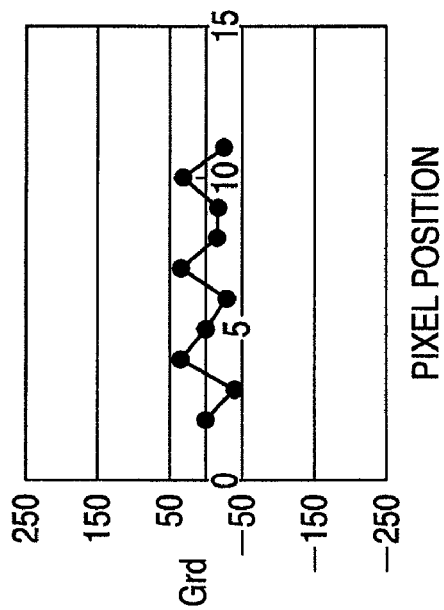
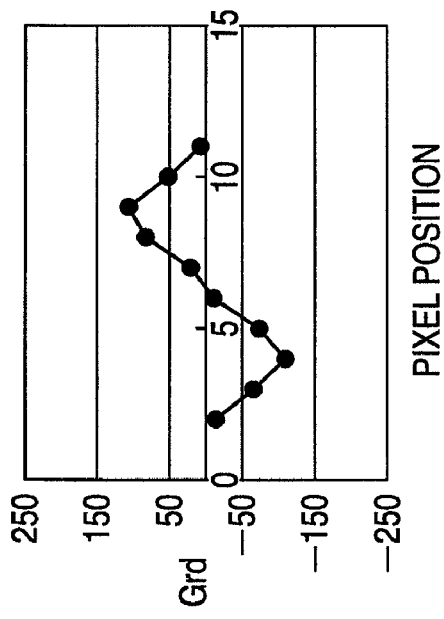

F I G. 11A
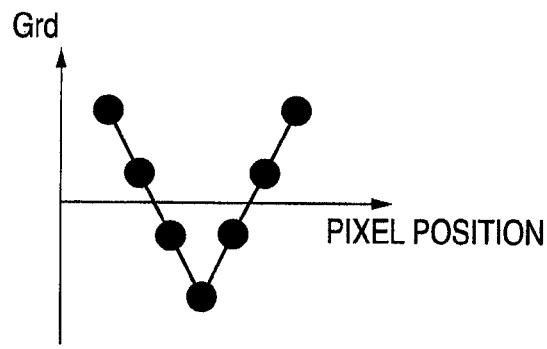
F I G. 11B
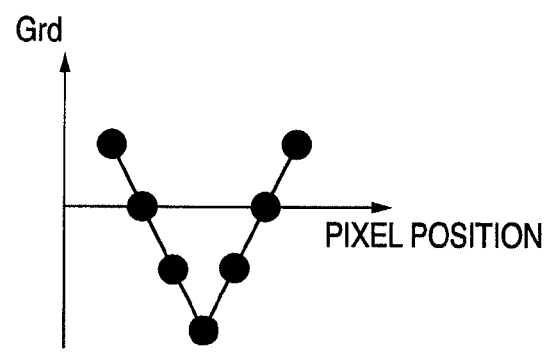
F I G. 11C
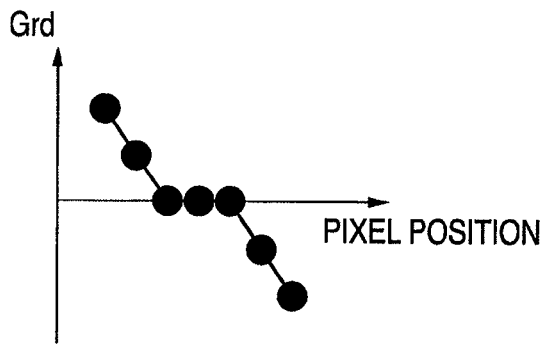
F I G. 11D
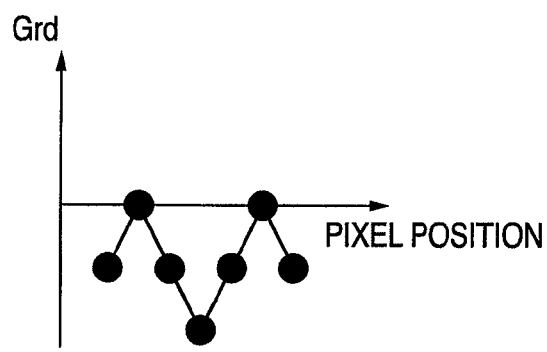

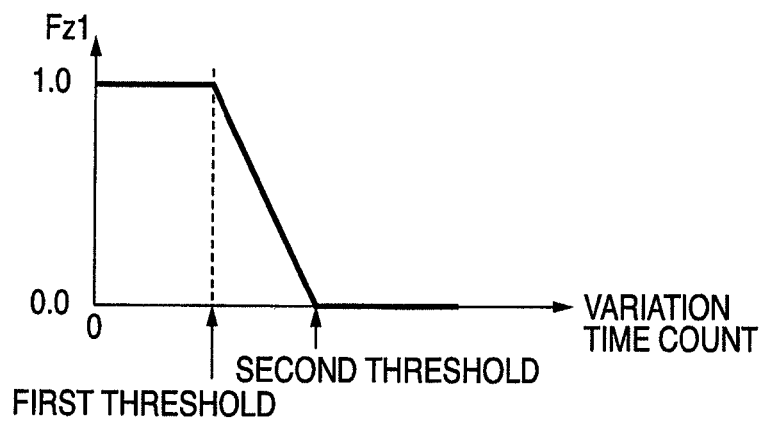
F I G. 13A
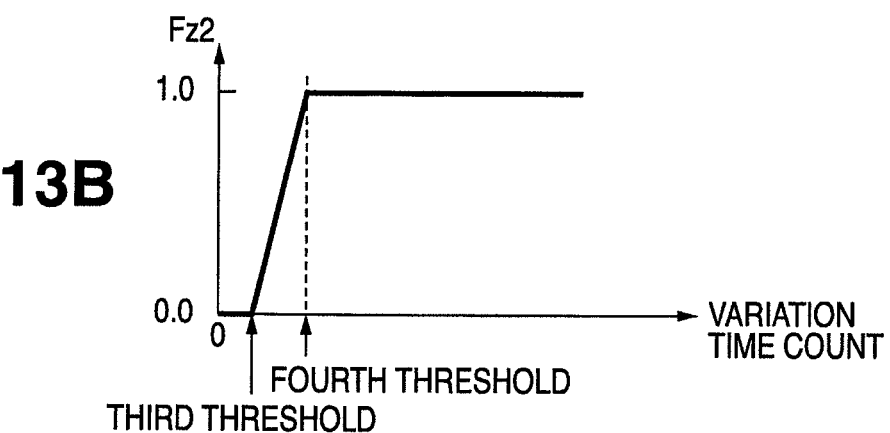
F I G. 13B
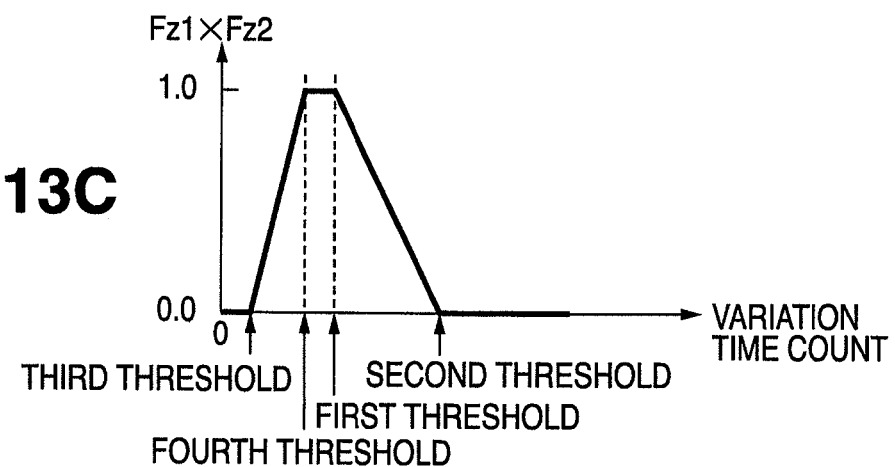
F I G. 13C
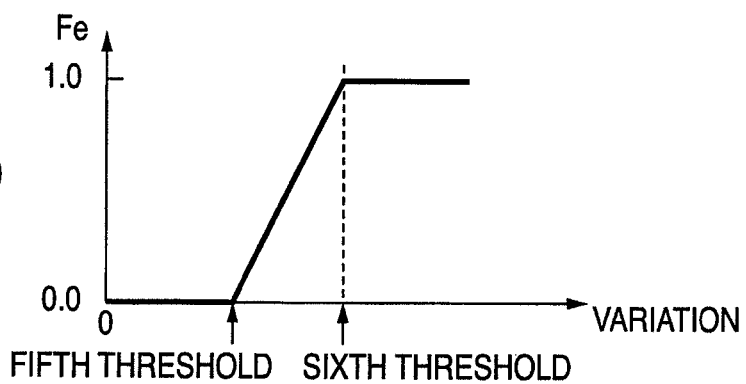
F I G. 13D

FIG. 15A

| -6 | -14 | -16 | -14 | -6 |
|---|---|---|---|---|
| -14 | 8 | 44 | 8 | -14 |
| -16 | 44 | 120 | 44 | -16 |
| -14 | 8 | 44 | 8 | -14 |
| -6 | -14 | -16 | -14 | -6 |

FIG. 15B

| -6 | -14 | -16 | -14 | -6 |
|---|---|---|---|---|
| -14 | 8 | 44 | 8 | -14 |
| -16 | 44 | -8 | 44 | -16 |
| -14 | 8 | 44 | 8 | -14 |
| -6 | -14 | -16 | -14 | -6 |

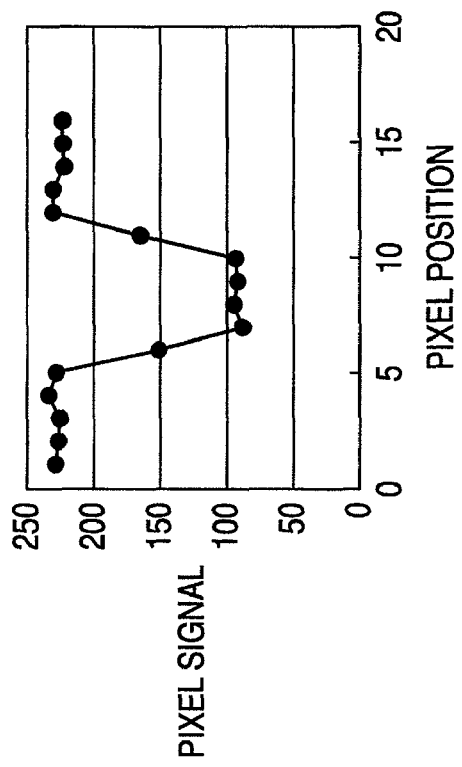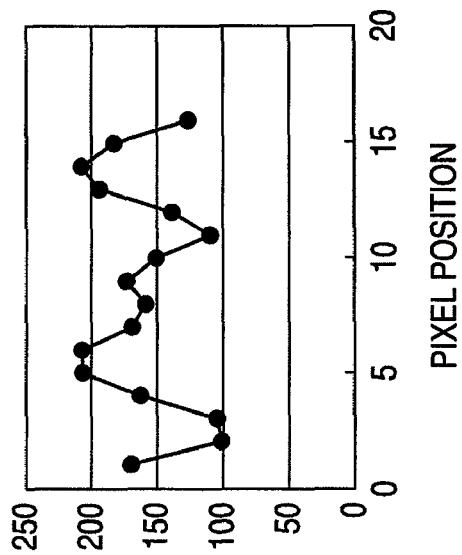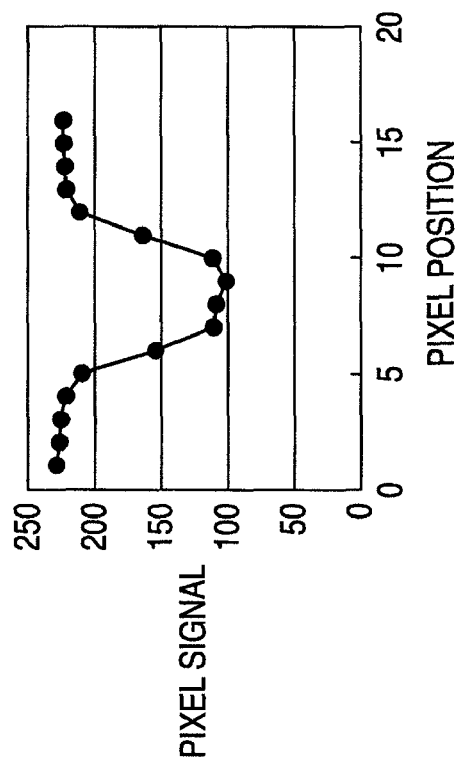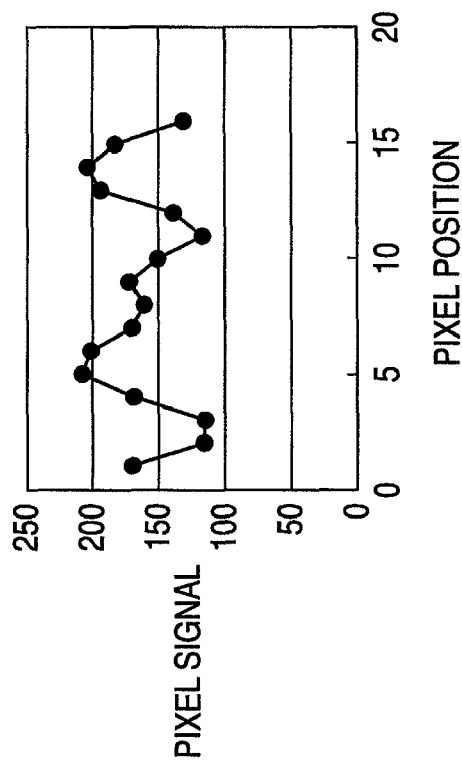

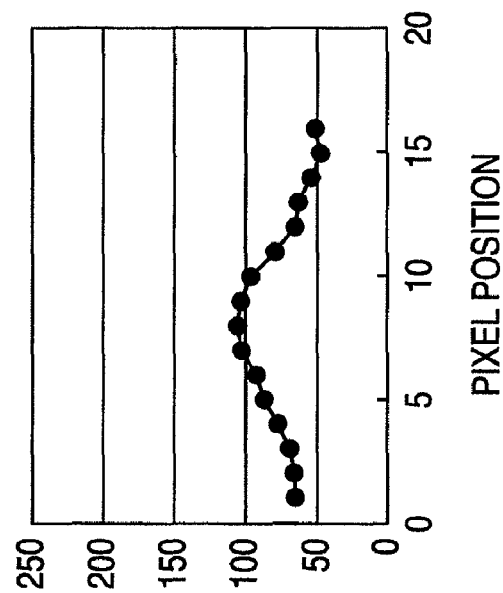
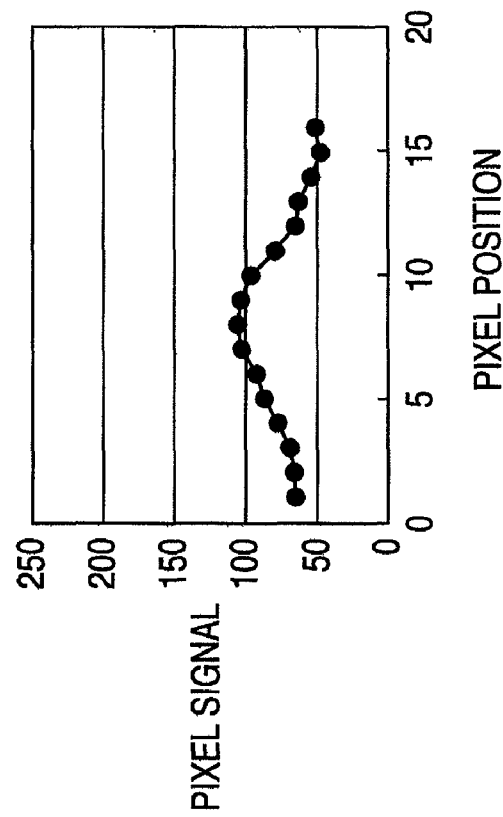

FIG. 23A

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

FIG. 23B

| 1 | 1 | 1 | 1 | 1 |
|---|---|---|---|---|
| 1 | 1 | 1 | 1 | 1 |
| 1 | 1 | −24 | 1 | 1 |
| 1 | 1 | 1 | 1 | 1 |
| 1 | 1 | 1 | 1 | 1 |

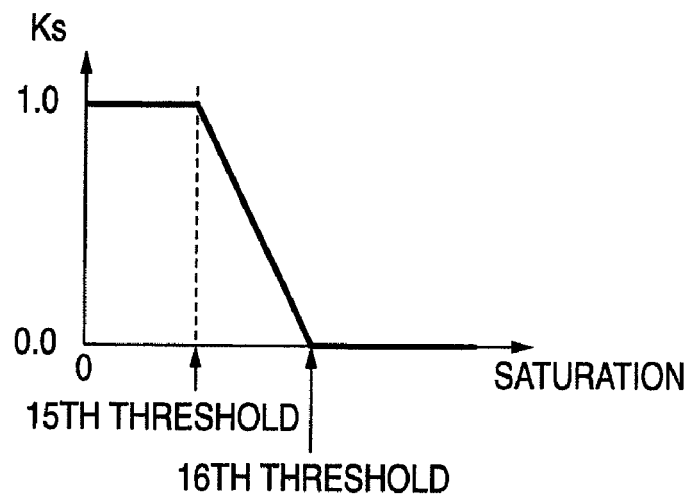
F I G. 29A
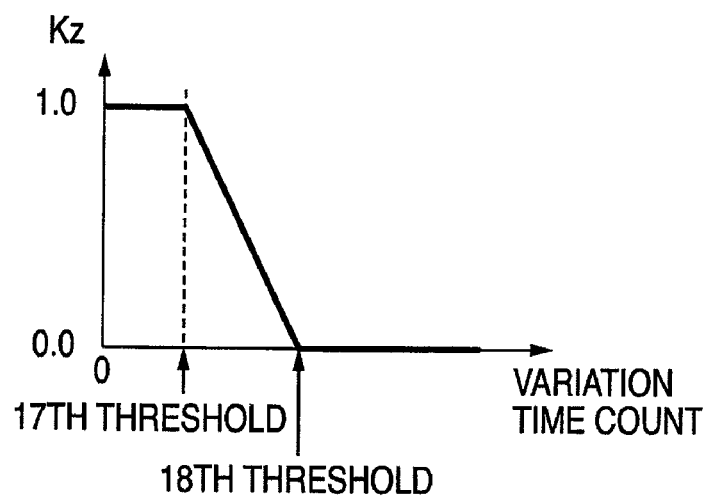
F I G. 29B
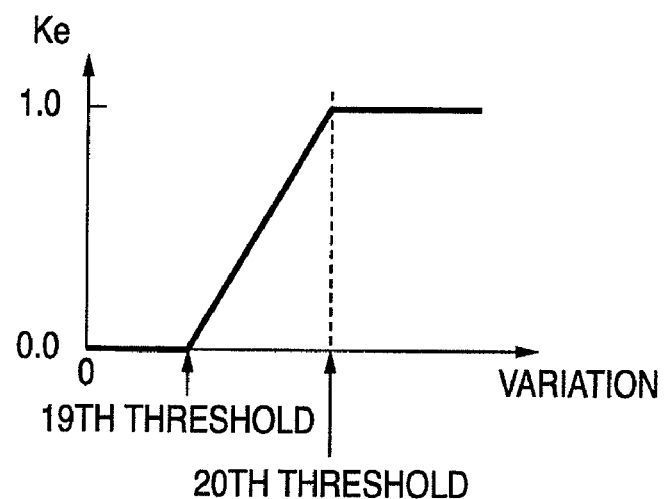
F I G. 29C

IMAGE PROCESSING APPARATUS, IMAGE PROCESSING METHOD, IMAGE PROCESSING PROGRAM, AND STORAGE MEDIUM

BACKGROUND OF THE INVENTION

1. Field of the Invention

The present invention relates to an image processing apparatus for performing an image adjusting process, image processing method, program and storage medium thereof.

2. Description of the Related Art

Conventionally, an image processing apparatus performing an image adjusting process is known. For example, a technique that separates a scanned image into two areas, that is, text and halftone areas, applies an edge emphasis process to the text area, and applies a smoothing process to the halftone area so as to enhance the sharpness and to reduce moiré at the same time is available (see Japanese Patent Laid-Open No. 2002-077623).

However, since an adjusting process to be applied to an image generally depends on the attributes of that image, if the attribute of the image is determined erroneously, an appropriate adjusting process can no longer be applied. For example, if a smoothing process is applied to the text area or an edge emphasis process is applied to the halftone area, the image deteriorates. For example, if one part of a character is determined as a text area, and the remaining part of that character is determined as a halftone area, switching of the edge emphasis and smoothing processes occurs during one character, thus considerably deteriorating the image. In particular, conventionally, since the ON/OFF states of the adjusting processes such as the edge emphasis process and the like are switched according to the attributes of an image, no transition state exists. For example, an image deteriorates at the position where the processes are switched.

SUMMARY OF THE INVENTION

The present invention allows realization of an improvement in image quality by performing an image adjusting process appropriately.

According to one aspect of the present invention, the foregoing problem is solved by providing an image processing apparatus, which applies an adjusting process to an image that includes a pixel to be processed, the apparatus comprising an extraction unit adapted to extract an image area with a predetermined size including the pixel to be processed, a variation calculation unit adapted to calculate a variation with respect to the pixel to be processed from signal values of pixels included in the image area, a variation time count calculation unit adapted to calculate a variation time count with respect to the pixel to be processed from the signal values of the pixels included in the image area, a definition unit adapted to define correspondence among the variation time count, the variation, and an adjusting level and an adjusting unit adapted to calculate the adjusting level from the variation time count and the variation using the definition unit, and to apply an adjusting process to a signal value of the pixel to be processed by the calculated adjusting level, wherein the definition unit defines the correspondence so that the adjusting level progressively changes in accordance with different variation time counts or different variations.

An image processing method, which applies an adjusting process to an image that includes a pixel to be processed, comprising the steps of extracting an image area with a predetermined size including the pixel to be processed, calculating a variation with respect to the pixel to be processed from signal values of pixels included in the image area, calculating a variation time count with respect to the pixel to be processed from the signal values of the pixels included in the image area and calculating an adjusting level from the variation time count and the variation using a definition unit which defines correspondence among the variation time count, the variation, and the adjusting level, and applying an adjusting process to a signal value of the pixel to be processed by the calculated adjusting level, wherein the definition unit defines the correspondence so that the adjusting level progressively changes in accordance with different variation time counts or different variations.

Further features of the present invention will become apparent from the following description of exemplary embodiments with reference to the attached drawings.

BRIEF DESCRIPTION OF THE DRAWINGS

FIG. 3 is a flowchart of an image process of the MFP;

FIGS. 6A and 6B are explanatory views of the scan range of an image sensing element;

FIGS. 8A to 8F are graphs for explaining the luminance, and primary derivative, and secondary derivative;

FIGS. 11A to 11D are graphs for explaining a variation time count;

FIGS. 13A to 13D are graphs for explaining an edge level defining process;

FIGS. 15A and 15B are explanatory views of edge emphasis filter coefficients;

FIGS. 18A to 18F are graphs for explaining image signals before and after edge emphasis;

FIGS. 23A and 23B are explanatory views of smoothing filter coefficients;

FIGS. 29A to 29C are graphs for explaining a blackening level setting process;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Arrangement of MFP>

Figure 1A:
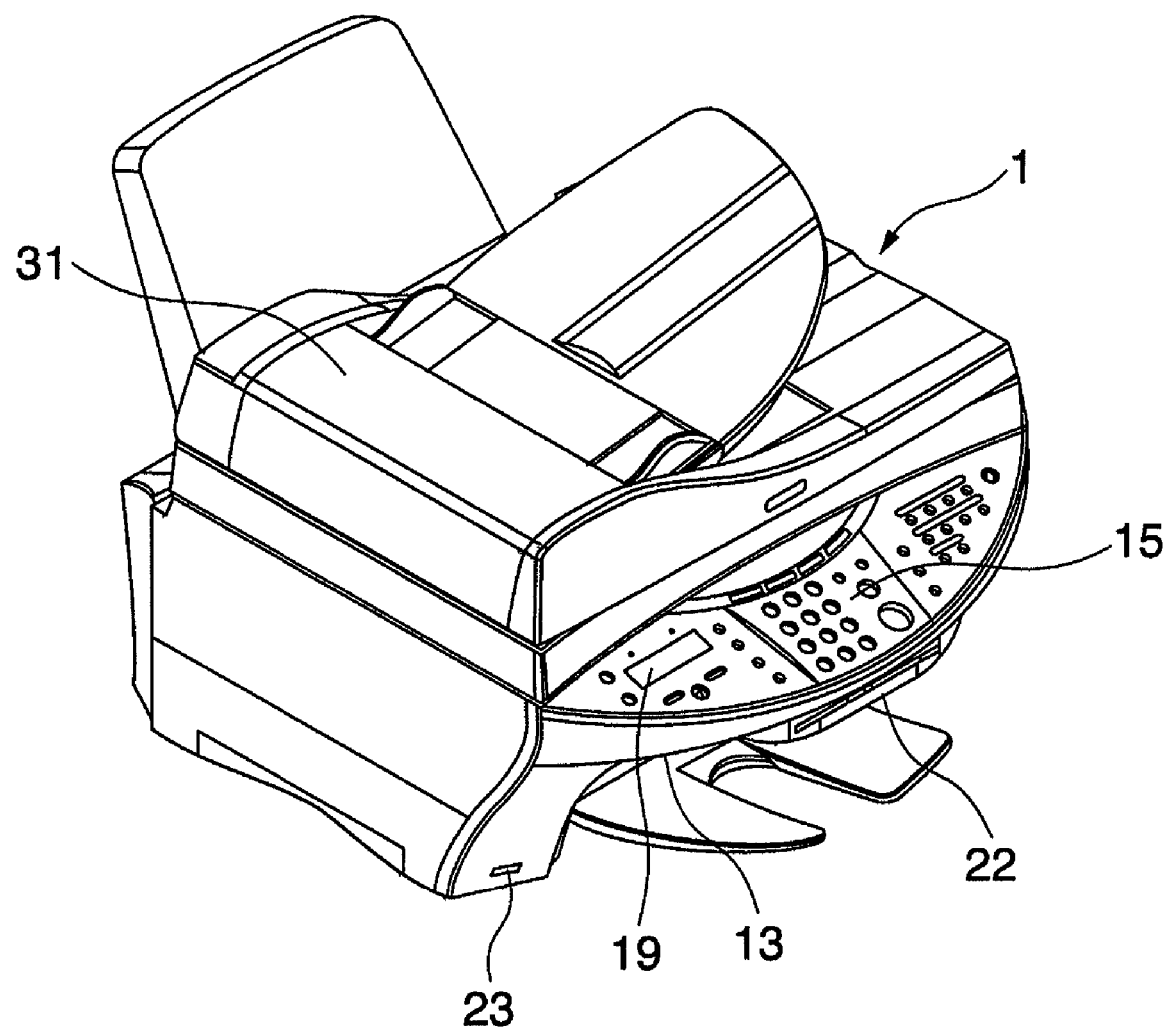
FIGS. 1A and 1B are explanatory views of an MFP.
Figure 1B:
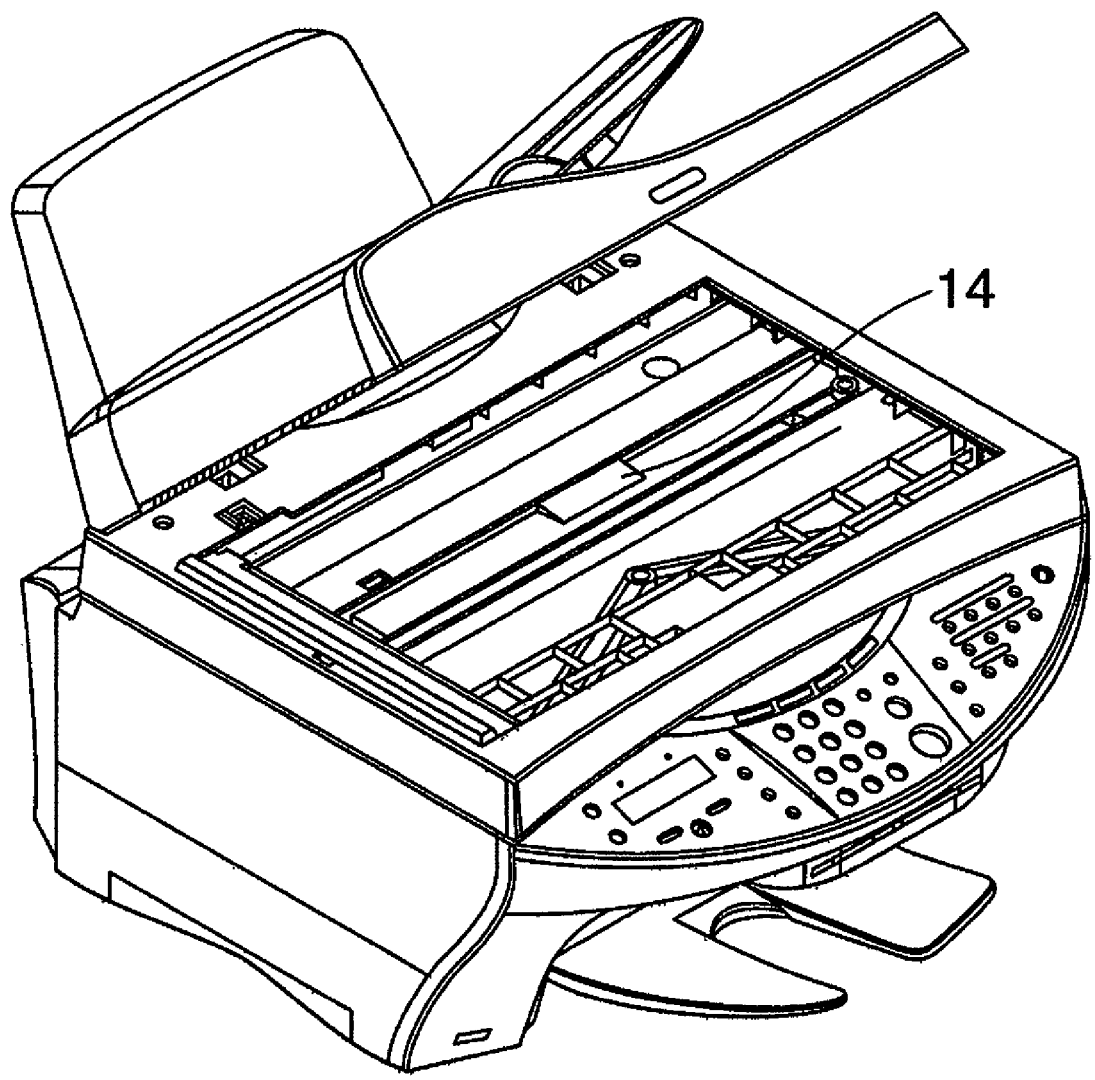

FIGS. 1A and 1B are schematic perspective views of a multi function printer (to be abbreviated as MFP hereinafter) 1 according to one embodiment of the present invention. FIG. 1A shows a state in which an ADF (auto document feeder) 31 of the MFP 1 is closed, and FIG. 1B shows a state in which the ADF 31 is open.

This MFP 1 basically has a function of printing data received from a host computer (PC) as a printer, and a function as a scanner. Furthermore, functions of the MFP alone include a copy function of printing an image scanned by the scanner using the printer, a function of printing image data read from a storage medium such as a memory card or the like, and a function of printing image data received from a digital camera or the like.

Referring to FIGS. 1A and 1B, the MFP 1 comprises a scanning unit 14 such as a flatbed scanner or the like, and a print unit 13 of an ink-jet system, electrophotography system, or the like. Also, the MFP 1 comprises a display unit 19 such as a display panel or the like, and an operation unit 15 including various key switches, and the like. The MFP 1 comprises a USB port (not shown) used to communicate with the PC on its back surface of the MFP 1, and the USB port allows the MFP 1 to communicate with the PC. The MFP 1 comprises a card interface 22 including a card slot used to read out data from various memory cards, and a camera interface 23 including a camera port used to make data communications with a digital camera. In addition, the MFP 1 comprises the ADF 31 used to automatically set a document on a document table.

Figure 2:
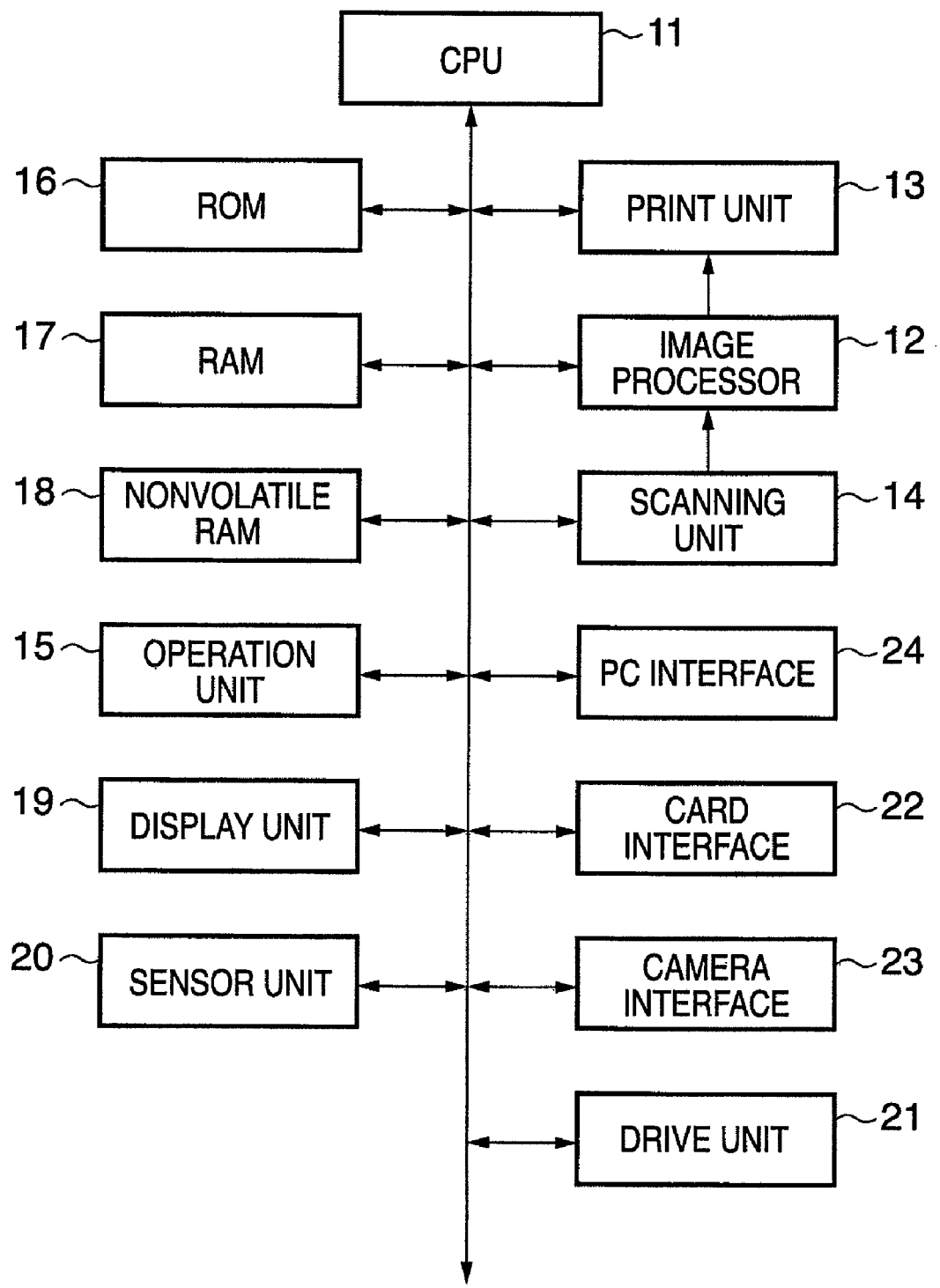
FIG. 2 is a block diagram for explaining the control arrangement of the MFP.

FIG. 2 is a block diagram showing the internal arrangement of the MFP 1. Referring to FIG. 2, a CPU 11 controls various functions of the MFP 1, and executes image process programs stored in a ROM 16 in accordance with predetermined operations at the operation unit 15. By executing the programs, the CPU 11 can select a pixel to be processed, and can extract an image area with a predetermined size including the pixel to be processed. The CPU 11 can calculate a variation, variation time count, and variation acceleration associated with the image area based on signal values of pixels included in the image area. The ROM 16 stores various tables and mathematical formulas used in image processes, and serves as a defining unit which defines correspondence among the variation, variation time count, and variation acceleration, and various adjusting levels. The scanning unit 14 which comprises a CCD scans a document image, and outputs red (R), green (G), and blue (B) analog luminance data. Note that the scanning unit 14 may comprise a contact image sensor (CIS) in place of the CCD. Also, when the MFP 1 comprises the ADF 31, it is convenient to continuously scan order sheets.

The card interface 22 loads image data, which is captured by, for example, a digital still camera (to be abbreviated as DSC hereinafter) and is recorded on a memory card or the like, in accordance with operations at the operation unit 15. Note that the color space of the image data loaded via the card interface 22 is converted from that of the DSC (e.g., YCbCr) into a standard RGB color space (e.g., NTSC-RGB or sRGB) if necessary. The loaded image data undergoes various kinds of processes required for an application such as resolution conversion to the effective number of pixels, and the like, based on its header information. The camera interface 23 is used to directly connect the DSC and to read image data.

An image processor 12 executes image processes such as conversion of a read signal value, an image adjusting/modification process, conversion from luminance signals (RGB) into density signals (CMYK), scaling, gamma conversion, error diffusion, and the like. The adjusting process to be executed by the image processor 12 includes an edge emphasis process, smoothing process, substitution process, achromatization process, and the like, and the image processor 12 serves as an adjusting unit. Data obtained by the image processes in the image processor 12 is stored in a RAM 17. When adjusted data stored in the RAM 17 reaches a predetermined amount, the print unit 13 executes a print operation.

A nonvolatile RAM 18 comprises, for example, a battery backed-up SRAM or the like, and stores data unique to the MFP 1 or the like. The operation unit 15 comprises a photo direct print start key which allows the user to select image data stored in a storage medium and to start printing. The operation unit 15 also comprises a key used to print an order sheet, a key used to scan an order sheet, and the like. The operation unit 15 may also comprise a copy start key in a monochrome copy mode or color copy mode, a mode key used to designate a mode such as a copy resolution, image quality, and the like, a stop key used to stop a copy operation or the like, a numerical keypad used to input a copy count, a registration key, and the like. The CPU 11 detects the pressing states of these keys and controls respective units according to the detected states.

The display unit 19 comprises a dot matrix type liquid crystal display unit (LCD) and an LCD driver, and makes various displays under the control of the CPU 11. Also, the display unit 19 displays thumbnails of image data recorded in a storage medium. The print unit 13 comprises an ink-jet head of an ink-jet system, general-purpose IC, and the like. The print unit 13 reads out print data stored in the RAM 17 and prints it out as a hard copy under the control of the CPU 11.

A drive unit 21 includes stepping motors for driving feed and discharge rollers, gears for transmitting the driving forces of the stepping motors, a driver circuit for controlling the stepping motors, and the like in order to operate the scanning unit 14 and print unit 15.

A sensor unit 20 includes a print sheet width sensor, print sheet sensor, document width sensor, document sensor, print medium sensor, and the like. The CPU 11 detects the states of a document and print sheet based on information obtained from this sensor unit 20.

A PC interface 24 is an interface with the PC, and the MFP 1 performs a print operation, scan operation, and the like from the PC via the PC interface 24. In a copy operation, image data scanned by the scanning unit 14 undergoes a data process inside the MFP, and is printed using the print unit 13.

Upon instruction of a copy operation from the operation unit 15, the scanning unit 14 scans a document set on the document table. The scanned data is sent to the image processor 12 and undergoes the image process. Then, the processed data is sent to the print unit 13, thus executing a print process.

<Image Process>

FIG. 3 is a flowchart of the image process executed in a copy mode. Respective steps will be described below. The CPU 11 applies shading correction to image data, which is scanned by the scanning unit 14 and is A/D-converted, so as to adjust variations of an image sensing element in STEP 301.

After that, the CPU 11 executes input device color conversion in STEP 302. As a result, the device-dependent color space of signal data is converted into a standard color space domain. For example, the standard color space includes sRGB specified by the IEC (International Electrotechnical Commission). Also, AdobeRGB propounded by Adobe Systems may be used. The conversion method includes an arithmetic method using a 3×3 or 3×9 matrix, a lookup table method which determines values based on a table that describes conversion rules, and the like.

In STEP 303, the CPU 11 applies an adjusting/modification process to the converted data. The process contents include an edge emphasis process that adjusts blurring due to scanning, a text modification process that improves legibility of text, a process for removing bleed-through that has occurred due to scanning upon light irradiation, and the like. In STEP 304, the CPU 11 executes an enlargement/reduction process to convert the data to a desired scale when the user designates a zoom scale, in a 2-in-1 copy mode that assigns two document images on one sheet, or the like. As the conversion method, methods such as bicubic, nearest neighbor, and the like are generally used.

In STEP 305, the CPU 11 converts the data on the standard color space into signal data unique to an output device. The MFP according to this embodiment adopts an ink-jet system, and executes a conversion process into ink color data such as cyan, magenta, yellow, black, and the like. This conversion can use the same method as in STEP 302.

Furthermore, in STEP 306 the CPU 11 converts the data into the number of printable levels. For example, in the case of binary expression, that is, ON/OFF of ink dots, the data may be binarized by a quantization method such as error diffusion or the like. As a result, the data is converted into a data format that the printer can print, and a print operation is executed based on that data, thus forming an image.

<Process Unit>

Figure 4A:
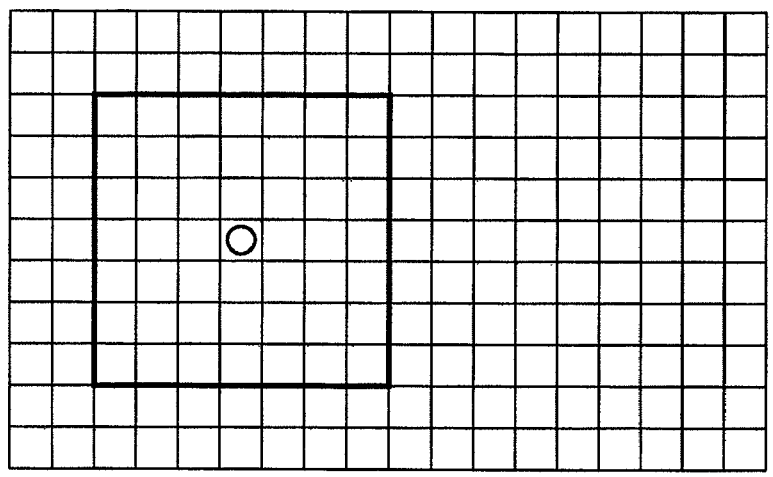
FIGS. 4A to 4C are explanatory views of a process unit.
Figure 4B:
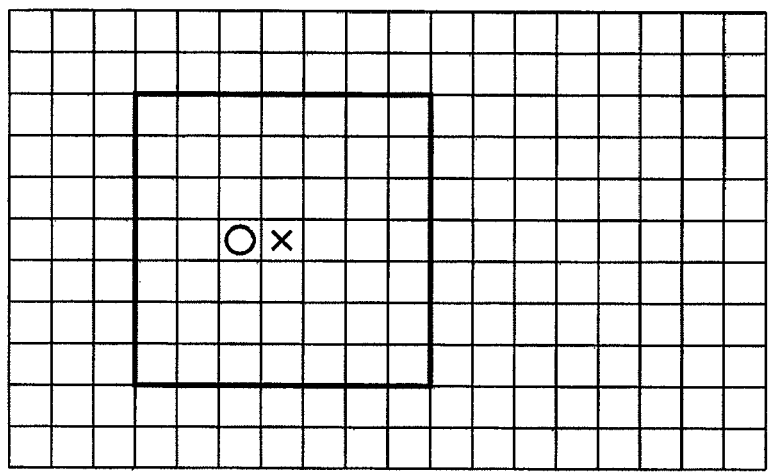

FIG. 4A is a view for explaining a process unit upon execution of the adjusting process. Assuming that a pixel indicated by "circle" in FIG. 4A is a pixel of interest (pixel to be processed), an area defined by 7×7 pixels including the pixel of interest (7×7 area) is defined, as indicated by the bold line in FIG. 4A. An image process for the pixel of interest is executed using image signals in this defined 7×7 area. After execution of the process of the pixel of interest, a pixel that neighbors the pixel of interest is defined as the next pixel of interest, as indicated by "x" in, for example, FIG. 4B, and a 7×7 area is similarly defined to execute the image process. After that, the pixel of interest is similarly shifted pixel by pixel in turn and a new 7×7 area is defined in each case, thus adjusting all pixels to be processed.

Figure 4C:
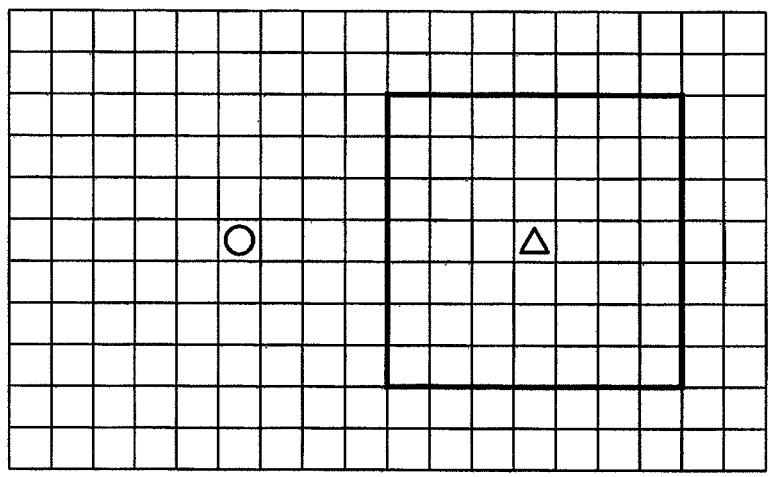

A case will be explained below wherein the process unit is an area unit. A 7×7 area is defined for a pixel indicated by "circle" in FIG. 4A, and an adjusting level to be defined for "circle" is applied to a plurality of pixels, for example, all pixels, in the 7×7 area. As the next process unit, a 7×7 area is defined for a pixel indicated by "triangle" in FIG. 4C. In this way, the process unit is shifted, so that the 7×7 area for "circle" neighbors that for "triangle".

However, since the pixel unit is preferably used as the process unit to define the adjusting level at higher accuracy, the pixel unit will be described as the process unit in this embodiment.

Figure 5:
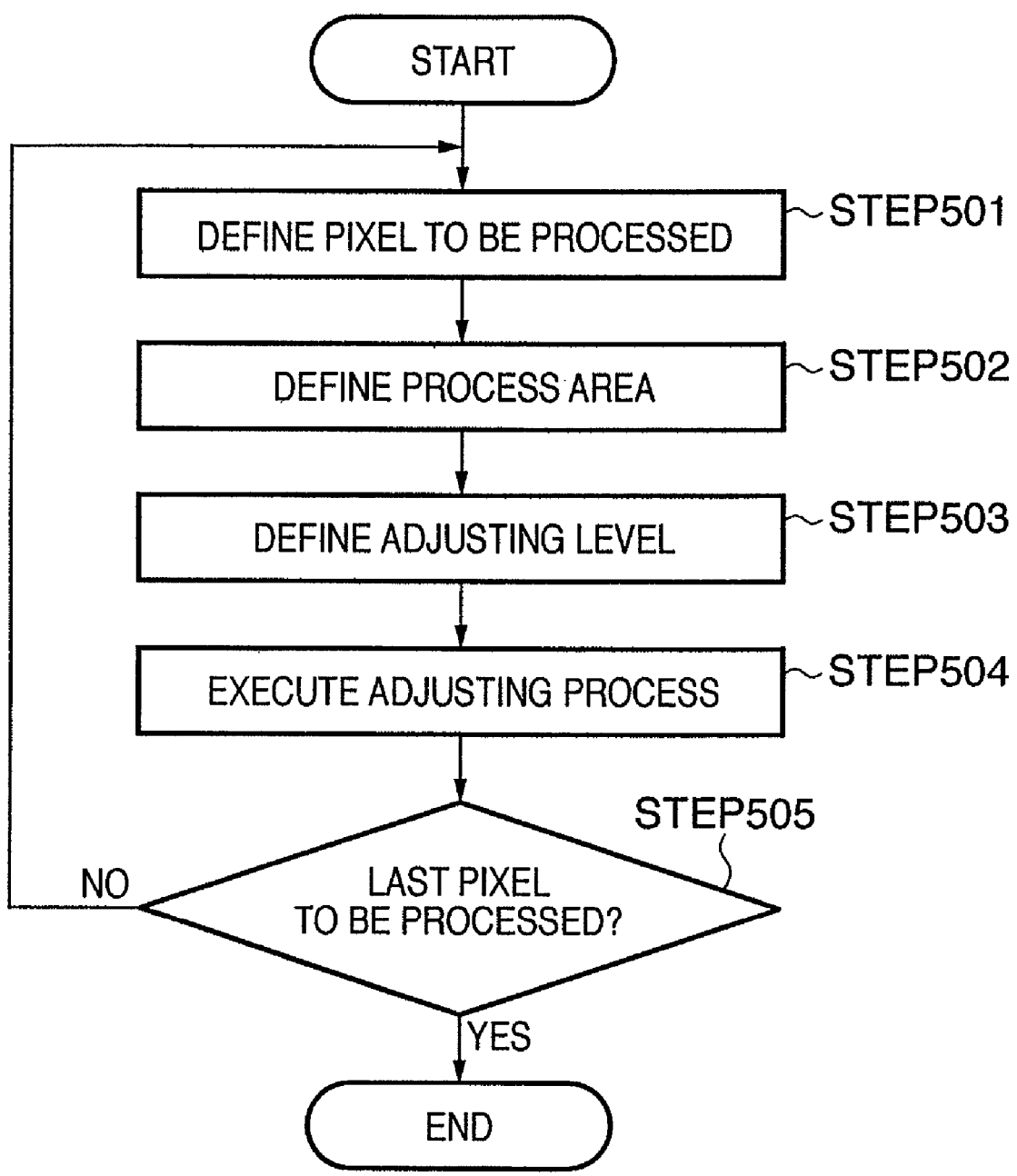
FIG. 5 is a flowchart of movement of a process unit.

FIG. 5 is a flowchart showing a shift procedure of the process unit. In STEP 501, the CPU 11 defines a process target (pixel to be processed). Immediately after START, the CPU 11 defines a first pixel to be processed. If the process returns from STEP 505 to STEP 501, the CPU 11 defines the next pixel to be processed.

STEP 502 is a process area defining step. The process area is an area configured by a plurality of pixels (7×7 area in the above description) including the process unit, as described above.

STEP 503 is an adjusting level defining step. The CPU 11 sets an adjusting level for the process unit.

STEP 504 is an adjusting execution step. The CPU 11 adjusts the process unit using the adjusting level defined in STEP 503.

STEP 505 is a last adjusting target checking step. That is, the CPU 11 checks if the process unit is the last one. If the process unit is not the last one (NO), the process returns to STEP 501. If the process unit is the last one (YES), the process reaches "END".

In the embodiments to be described hereinafter, the 7×7 area is used as the process area. This is because the pixel range of a document to be scanned by one pixel of the image sensing element (CCD or CIS) used in the scanning unit is designed to include six pixels or less. Although the pixel range to be scanned is designed to include six pixels or less, reflected light from a document that enters the image sensing element receives various influences due to float of a document from the document table, unevenness of a document, and the like. For this reason, one pixel of the image sensing element may scan a range exceeding six pixels. The embodiments to be described hereinafter show a plurality of graphs used to explain image signals obtained by scanning a document. However, these image signals are not always obtained from reflected light within six pixels or less.

FIGS. 6A and 6B simply illustrate the range of reflected light that comes from a document and enters one pixel of the image sensing element. As shown in FIG. 6A, the image sensing element used in this embodiment is designed so that reflected light within six pixels from a 7-pixel range of a document enters one pixel of the image sensing element (as described above, reflected light that exceeds six pixels may enter in some cases). That is, reflected light from one pixel on a document influences seven pixels of the image sensing element. This causes edge blurring described in the paragraphs of the related art, and deteriorates sharpness. The embodiments to be described hereinafter aim at reducing blurring as one of their objects. For example, the second embodiment to be described later emphasizes an edge by substituting the pixel of interest by a substitute candidate pixel. Hence, by selecting a substitute candidate from a pixel area less influenced by a document pixel corresponding to the pixel of interest, the edge emphasis effect can be enhanced. For this reason, an area which is influenced by one pixel of a document image is assured as the process area. Therefore, the 7×7 area is defined as the process area. In order to enhance the edge emphasis effect more, it is effective to set an area exceeding 7×7 pixels as a reference area. Also, when one pixel of the image sensing element is designed to receive reflected light from a 3-pixel range, as shown in FIG. 6B, the process area may be defined as small as a 3×3 area. In this manner, the reference area can be defined as needed in accordance with the performance of the image sensing element such as the number of pixels influenced by one pixel of a document image, the spot size, the number of blurred pixels, Modulation Transfer Function (MTF), and the like.

<Definition of Terms>

Terms used in the present specification will be defined below.

A variation is a value that represents the magnitude of the variations of pixel signal values in a surrounding pixel group having a pixel to be processed as the center. In this embodiment, of the absolute values (edge amounts) of differences between luminance values of two pixels that neighbor one pixel on two sides, a maximum one will be explained as the variation. However, the present invention is not limited to such specific value. For example, the variation may be a value that expresses the difference (magnitude) of changes such as the absolute value of the primary derivative of a value related to an image signal of a pixel of interest or the like, or a value that representatively expresses the difference (magnitude) of changes of values related to image signals in an area of interest.

A variation time count is a value that represents the frequency of occurrence of variations of image signal values in a surrounding pixel group having the pixel to be processed as the center. In this embodiment, the difference between the luminance values of two pixels that neighbor one pixel on two sides in the image area is ternarized using −1, 0, and 1, and the frequency of occurrence of increment/decrement of ternary data (the number of sign changes (the number of zero-crossing points)) will be described as the variation time count. However, the present invention is not limited to such specific value. The variation time count is defined as a value that expresses the frequency of occurrence of changes in value associated with image signals such as the number of zero-crossing points or spatial frequency of the primary derivatives of values associated with image signals in the image area, a black-white change count after binarization, and the like.

A variation acceleration is a value that represents the acceleration of variations of pixel signal values in a surrounding pixel group having the pixel to be processed as the center. In the following embodiments, the variation acceleration will be explained as a value obtained by further calculating a difference from the differences of luminance values in the image area. However, the present invention is not limited to such specific value. For example, the acceleration variation may be a value that expresses the acceleration of changes such as the secondary derivative of values associated with image signals in an area of interest and the like.

A saturation will be explained as a maximum absolute value of image signal differences of respective colors of a pixel or area of interest in the following embodiments. However, the present invention is not limited to such specific value. The saturation is defined as a value that expresses the distance from the chromaticity axis.

Note that a range from 0 to 255 that an image signal can assume will be exemplified. However, the range of the image signal is not limited to such a specific one, and it may be defined to fit in the MFP or image process.

An adjusting level defining process will be described below. Note that a range from 0 to 255 that an image signal can assume will be exemplified. However, the range of the image signal is not limited to such a specific one, and it may be defined to fit in the MFP or image process.

This embodiment uses an edge level or magnitude as the adjusting level, and executes an edge emphasis filter process as the adjusting process. An edge emphasis amount of an edge emphasis filter (to be described later) is adjusted by the edge level, which is adaptively set based on the variation time count and variation. The edge level defining process and an application of the defined edge level will be described below.

Figure 7:
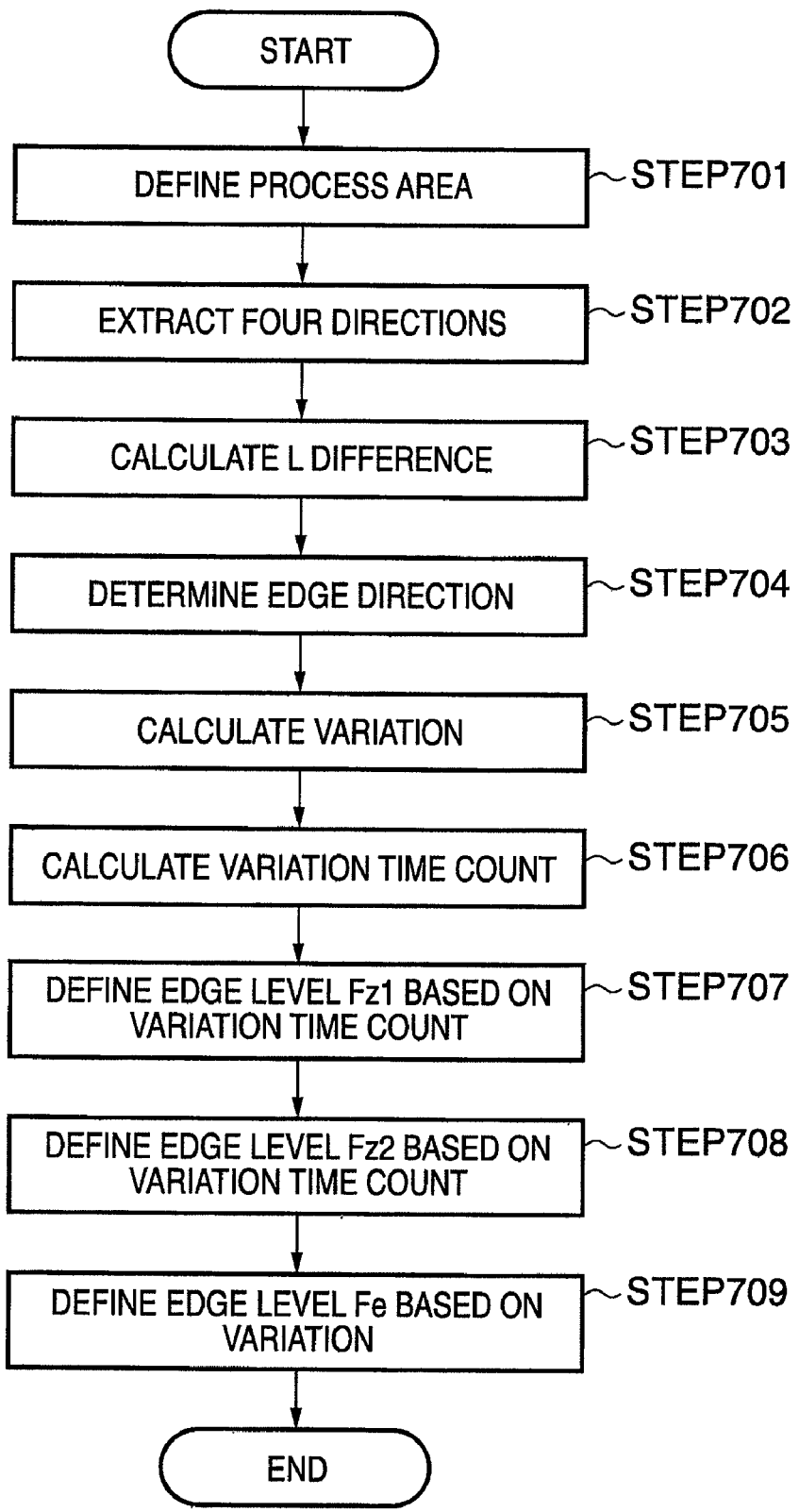
FIG. 7 is a flowchart of an adjusting level defining process according to the first embodiment.

FIG. 7 is a flowchart of the adjusting level defining process according to the first embodiment. The adjusting level defining process will be described below along respective steps of the flowchart.

<Adjusting Level Defining STEP 701: Define Process Area>

The CPU 11 defines a process area, that is, a 7×7 area including seven pixels in the horizontal direction and seven pixels in the vertical direction to have the pixel of interest as the center in an image configured by RGB multi-valued image signals, and generates a 7×7 process area of luminance L by calculating luminance L from respective pixel values of the process area by:

$$L = (R + 2 \times G + B)/4 \quad (1)$$

Note that this embodiment uses luminance L given by equation (1), but may adapt another luminance. For example, $L^*$ of a uniform color space $L^*a^*b^*$ may be used as a luminance, or Y of YCbCr may be used as a luminance. FIG. 8A shows luminance values upon scanning a black vertical line in a white background in the horizontal direction. FIG. 8B shows luminance values upon scanning halftone dots that line up in the horizontal direction in a white background, in the horizontal direction.

<Adjusting Level Defining STEP 702: Extract Four Directions>

Figure 9:
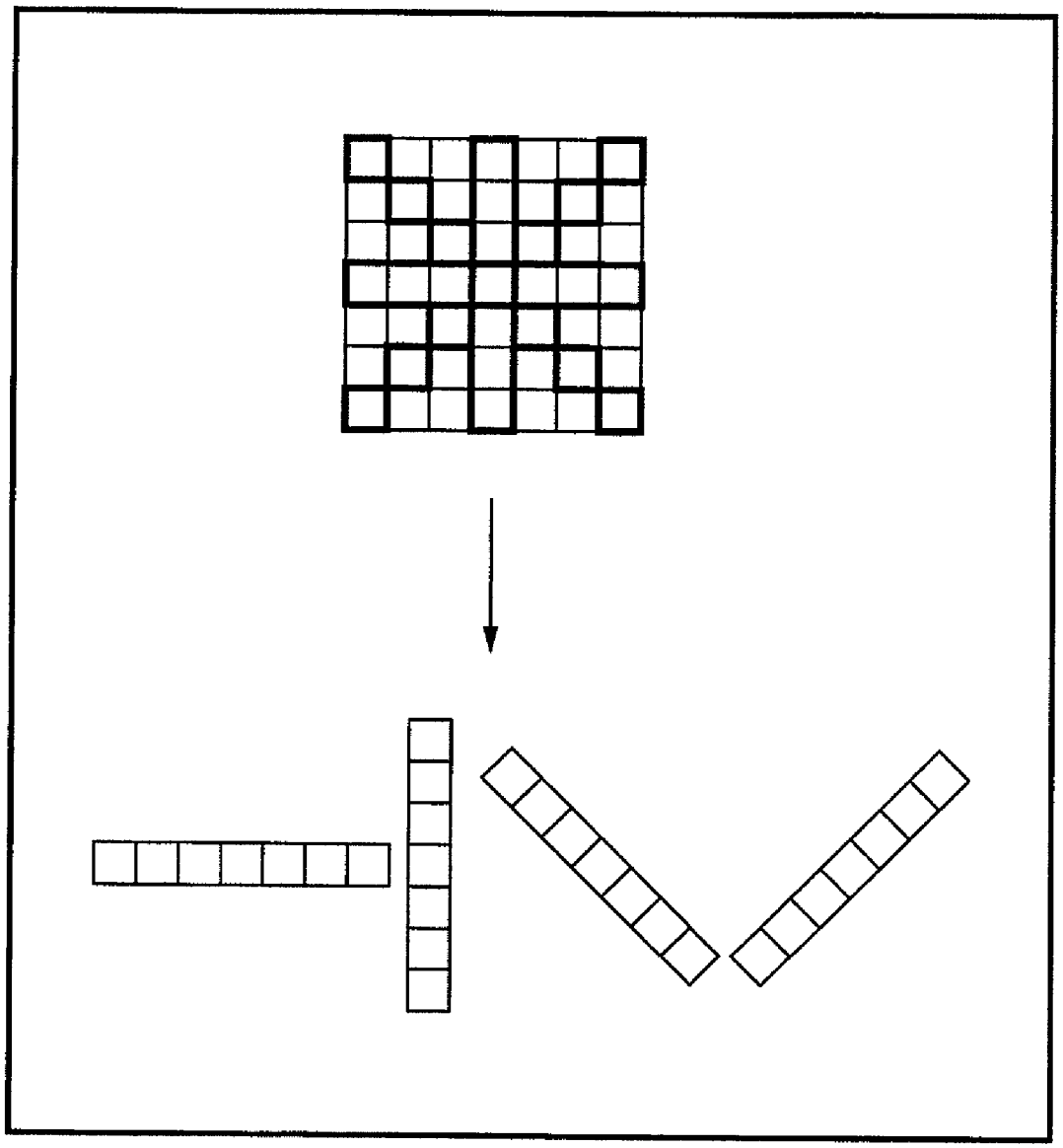
FIG. 9 is an explanatory view of 4-direction extraction.

The CPU 11 extracts, from the process area of L generated in STEP 701, seven pixels in each of a total of four directions, that is, one horizontal direction, one vertical direction, and two oblique directions, as shown in FIG. 9.

<Adjusting Level Defining STEP 703: Calculate L Difference>

Figure 10:
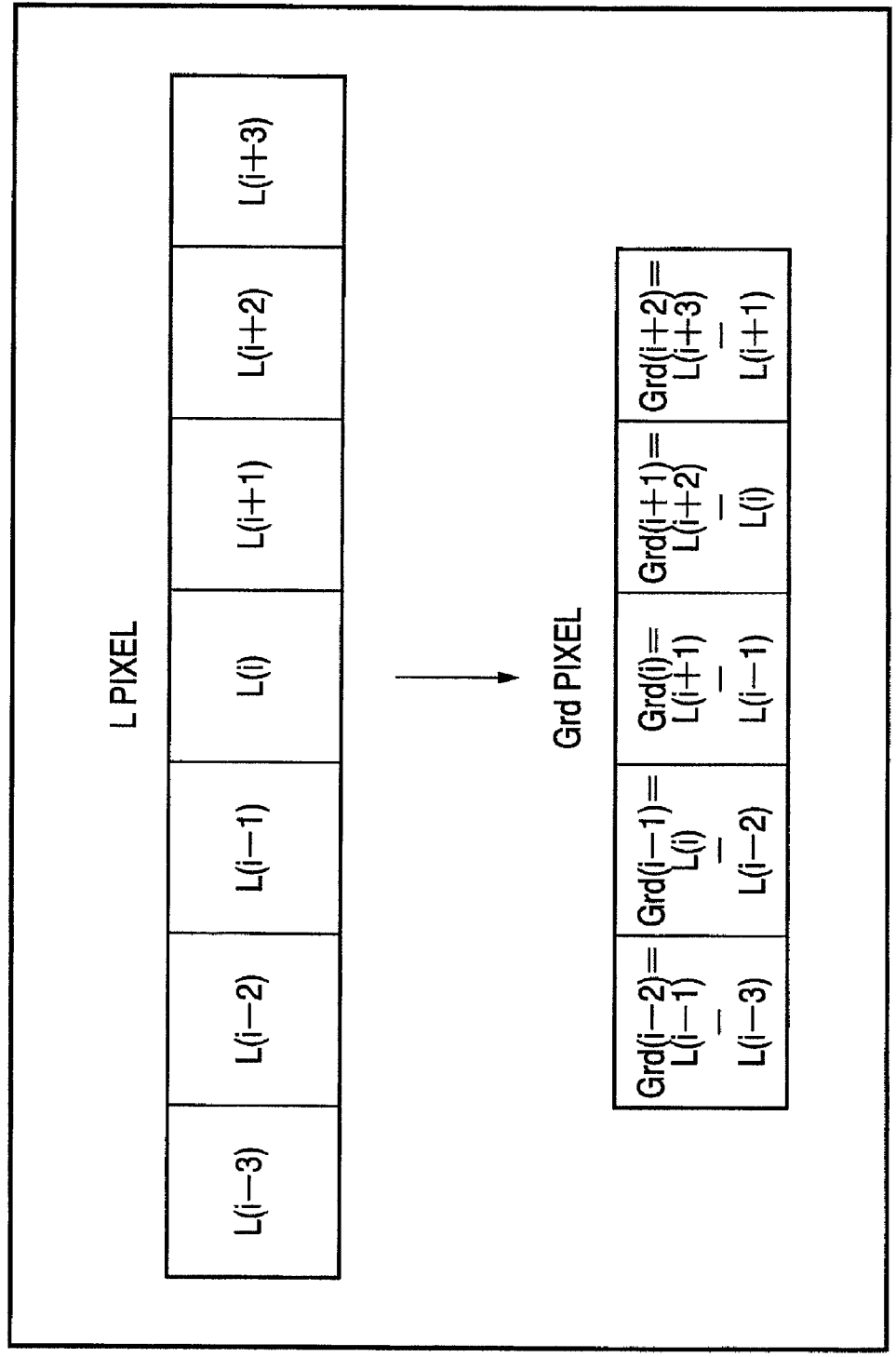
FIG. 10 is an explanatory view of an L difference.

The CPU 11 calculates differences Grd of L of five pixels in each direction from L in the four directions extracted in STEP 702, as shown in FIG. 10, and using:

$$Grd(i) = L(i+1) - L(i-1) \quad (2)$$

where L(i−1) is a pixel before pixel L(i), and L(i+1) is a pixel after pixel L(i).

Note that the L difference calculation method is not limited to such a specific method. For example, differences between neighboring pixels may be calculated, or differences between pixels further separated from those before and after a given pixel described above may be calculated. FIGS. 8C and 8D show Grd calculated by applying equation (2) to L in FIGS. 8A and 8B.

<Adjusting Level Defining STEP 704: Determine Edge Direction)

The CPU 11 calculates Grd absolute values in the four directions of the pixel of interest in Grd in the four directions calculated in STEP 703. The CPU 11 determines a direction that shows a maximum Grd absolute value of those in the four directions as an edge direction of the pixel of interest.

<Adjusting Level Defining STEP 705: Calculate Variation>

The CPU 11 can calculate five Grd values in STEP 703 from seven pixels that line up in the edge direction determined in STEP 704. The CPU 11 compares these five Grd values and calculates their maximum absolute value as a variation (edge amount) of the pixel of interest. An edge is stronger with increasing variation, and is close to flat with decreasing variation.

<Adjusting Level Defining STEP 706: Calculate Variation Time Count>

The CPU 11 calculates a variation time count as a total of the four directions from the Grd values in the four directions calculated in STEP 703. That is, the CPU 11 calculates, as the variation time count (the number of zero-crossing points) of the pixel of interest, the number of changes in the sign of Grd from + to − or vice versa, as shown in FIG. 11A, or the number of changes in the sign of Grd from + to 0 and then to − at the next pixel, or from − to 0 and then to + at the next pixel, as shown in FIG. 11B.

Note that the first embodiment does not count, as the variation time count, a case in which the sign changes to sandwich zeros of a plurality of pixels, as shown in FIG. 11C, or a case in which the Grd value becomes zero but its sign does not change, as shown in FIG. 11D. The reason for this will be explained below. When the Grd values assume zero at the plurality of pixels or when the Grd values become zero but their sign does not change, a bold line is likely to be determined. As will be described in STEP 708 and STEP 1403, a level different from that for a thin line in FIG. 11A or 11B can be defined for the bold line.

Figure 12A:
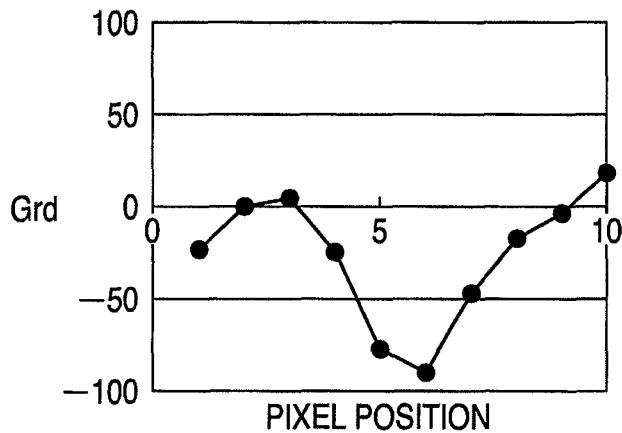
FIGS. 12A to 12C are graphs for explaining a variation time count adjusting process.
Figure 12B:
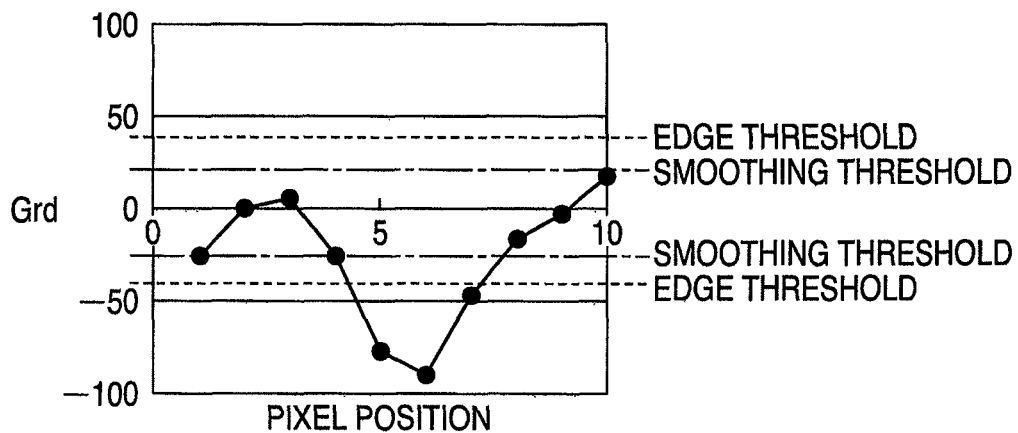
Figure 12C:
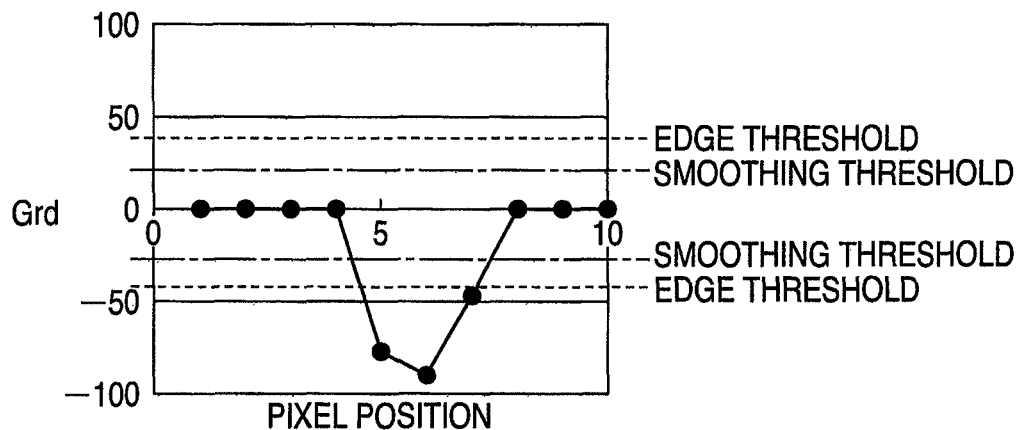

As shown in FIGS. 8A to 8F, text tends to have a smaller variation time count than halftone. However, depending on the density uniformity of a document or shading accuracy, text often has changes with small amplitudes in Grd, as shown in FIG. 12A. In such case, the variation time count increases like halftone, and if an adjusting level defining process (to be described later) is executed, an edge level close to that of halftone is undesirably defined. Hence, when the variation calculated in STEP 705 is relatively large, that is, when it exceeds a defined threshold, small Grd values are smoothed to zero to define an edge level with higher accuracy. More specifically, the variation calculated in STEP 705 is compared with a threshold (edge threshold, and if the variation exceeds the edge threshold, a smoothing threshold is defined, as shown in FIG. 12B. In case of Grd absolute values equal to or smaller than the smoothing threshold, the variation time count is counted to have Grd=0, as shown in FIG. 12C. In this manner, the variation time count of text can be suppressed, and the edge level defining process with high accuracy can be attained.

<Adjusting Level Defining STEP 707: Edge Level Defining Process 1 Based on Variation Time Count>

The CPU 11 adaptively defines an edge level or magnitude Fz1 in accordance with the variation time count calculated in STEP 706. FIG. 13A is a graph for explaining the Fz1 defining process in STEP 707: the abscissa plots the variation time count, and the ordinate plots Fz1. In case of the variation time count which is smaller than a first threshold and with which a text area is more likely to be determined, Fz1 is defined to be 1 to emphasize the edge. In case of the variation time count which is larger than a second threshold and with which a halftone area that readily causes moiré at high LPI is more likely to be determined, Fz1 is defined to be 0 so as not to emphasize moiré. In case of the variation time count falling within a range between the first and second thresholds (both inclusive), Fz1 is adaptively defined to progressively change according to the variation time count, so that Fz1=1 when the variation time count=the first threshold and Fz1=0 when the variation time count=the second threshold. In this way, switching of the processes is obscured at the boundary of the edge-emphasized area and non-emphasized area. More specifically, the CPU 11 can adaptively define Fz1 with reference to FIG. 13A or using:

$$Fz1 = (\text{second threshold} - \text{variation time count})/(\text{second threshold} - \text{first threshold}) \quad (3)$$

<Adjusting Level Defining STEP 708: Edge Level Defining Process 2 Based on Variation Time Count>

The CPU 11 adaptively defines an edge level Fz2 in accordance with the variation time count calculated in STEP 706. FIG. 13B is a graph for explaining the Fz2 defining process in STEP 708: the abscissa plots the variation time count, and the ordinate plots Fz2. FIG. 13B aims at attaining FIG. 13C when it is combined with FIG. 13A. As described in STEP 706, when the variation time count is zero, a bold line area is more likely to be determined. When such bold line area undergoes edge emphasis using an edge emphasis filter (to be described later), bordering in which a border part of the bold line area darkens occurs. In order to prevent bordering, in case of the variation time count which is smaller than a third threshold and with which the bold line area is more likely to be determined, Fz2 is defined to be 0 to suppress edge emphasis. In case of the variation time count which is larger than a fourth threshold and with which a thin line area is more likely to be determined, Fz2 is defined to be 1 to apply edge emphasis. In case of the variation time count falling within a range between the third and fourth thresholds (both inclusive), Fz2 is adaptively defined to progressively change in accordance with the variation time count, so that Fz2=0 when the variation time count=the third threshold and Fz2=1 when the variation time count=the fourth threshold. As a result, switching of the processes can be obscured at the boundary between the edge-emphasized area and non-emphasized area by the filter. More specifically, the CPU 11 can adaptively define Fz2 with reference to FIG. 13B or using:

$$Fz2 = (\text{variation time count} - \text{third threshold})/(\text{fourth threshold} - \text{third threshold}) \quad (4)$$

Fz1×Fz2 can implement the edge level shown in FIG. 13C. If bordering is required, Fz2=1 can be defined irrespective of the variation time count.

<Adjusting Level Defining STEP 709: Edge Level Defining Process Based on Variation>

The CPU 11 adaptively defines an edge level Fe in accordance with the variation calculated in STEP 705. FIG. 13D is a graph for explaining the Fe defining process in STEP 709: the abscissa plots the variation, and the ordinate plots Fe. In case of the variation which is smaller than a fifth threshold and with which a flat area is more likely to be determined, Fe=0 is defined so as not to roughen an image by emphasizing small variations. In case of the variation which is smaller than a sixth threshold and with which an edge area is more likely to be determined, Fe=1 is defined to apply edge emphasis. In case of the variation falling within a range between the fifth and sixth thresholds (both inclusive), Fe is adaptively defined to progressively change according to a change in variation, so that Fe=0 when the variation=the fifth threshold and Fe=1 when the variation=the sixth threshold. As a result, switching of the processes can be obscured at the boundary between the edge-emphasized area and non-emphasized area. More specifically, the CPU 11 can adaptively define Fe with reference to FIG. 13D or using:

$$Fe = (\text{variation} - \text{fifth threshold})/(\text{sixth threshold} - \text{fifth threshold}) \quad (5)$$

Figure 14:
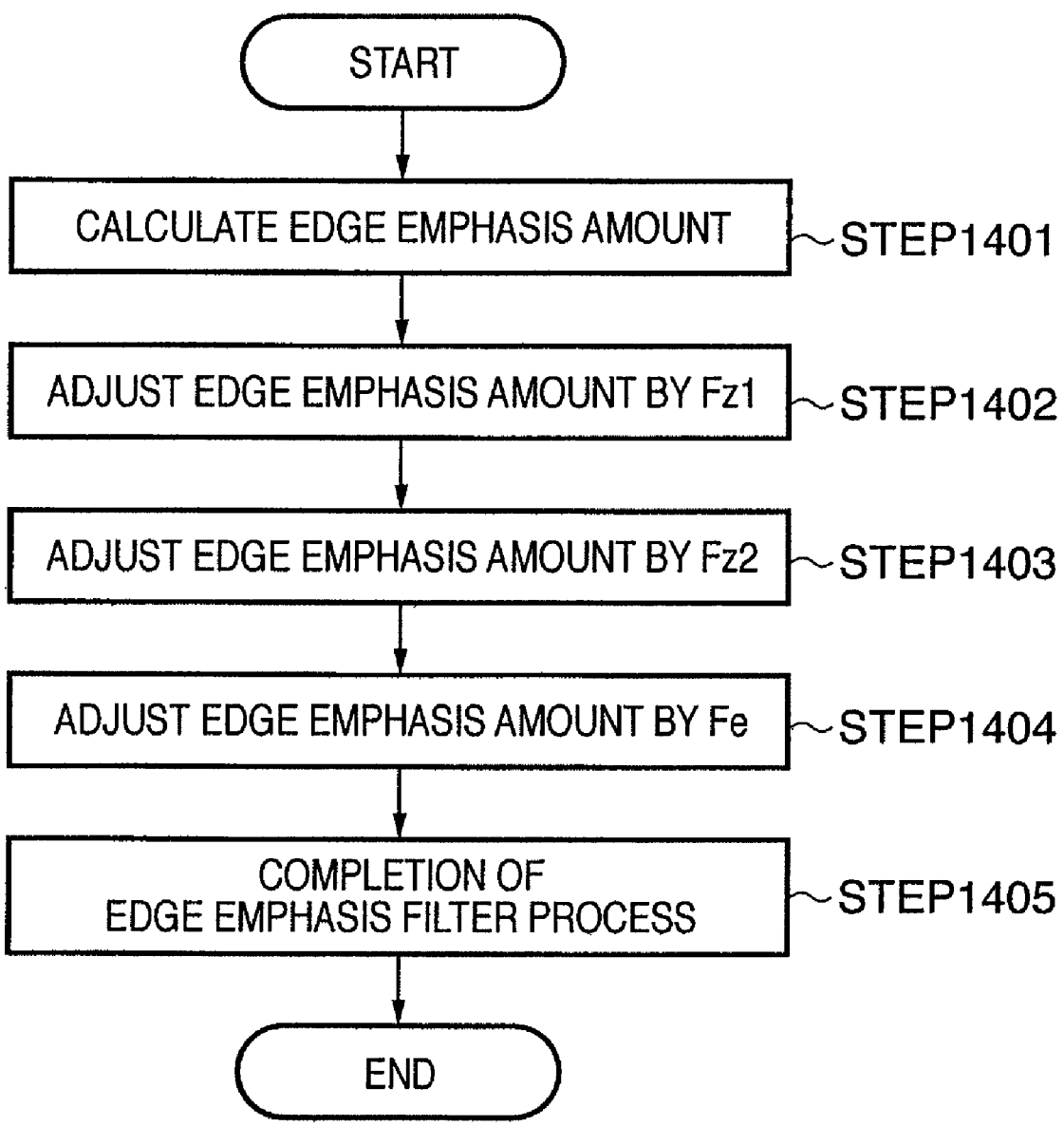
FIG. 14 is a flowchart of an adjusting process according to the first embodiment.

FIG. 14 is a flowchart of the adjusting process according to the first embodiment. The adjusting process will be described below along respective steps of the flowchart.

<Adjusting Process STEP 1401: Calculate Edge Emphasis Amount>

The CPU 11 calculates differences (edge emphasis amounts) between the pixel value of interest upon applying an edge emphasis filter and that before application for respective colors in the 7×7 RGB areas defined in STEP 701. This embodiment will exemplify a case in which a 5×5 edge emphasis filter is applied to have the pixel of interest as the center. However, the filter size need only be smaller than the process area size defined in STEP 701, and filter coefficients may be appropriately defined. FIG. 15A shows an example of filter coefficients of a 5×5 edge emphasis filter. Let N0 be a pixel value of interest, N1 be a pixel value of interest as a result of application of the filter in FIG. 15A, and ΔF be an edge emphasis amount. ΔF can be calculated by:

$$\Delta F = N1 - N0 \quad (6)$$

As shown in FIG. 15B, when the filter coefficient of the pixel of interest is defined to be a value obtained by subtracting the filter total value in FIG. 15A from the filter coefficient at the position of the pixel of interest in FIG. 15A, ΔF can be calculated merely by applying FIG. 15B.

<Adjusting Process STEP 1402: Adjust Edge Emphasis Amount by Fz1>

The CPU 11 adjusts the edge emphasis amounts ΔF calculated in STEP 1401 using the edge level Fz1 defined in STEP 707. The CPU 11 calculates an adjusted edge emphasis amount ΔFz1 using:

$$\Delta Fz1 = Fz1 \times \Delta F \quad (7)$$

By the process in STEP 1402, a text area with a small variation time count can undergo relatively strong edge emphasis, and a halftone area with a large variation time count can undergo relatively weak edge emphasis. Hence, the sharpness of text can be enhanced, and moiré can be prevented from being emphasized at the same time.

<Adjusting Process STEP 1403: Adjust Edge Emphasis Amount by Fz2>

The CPU 11 adjusts the edge emphasis amount ΔFz1 calculated in STEP 1402 using the edge level Fz2 defined in STEP 708. The CPU 11 calculates an adjusted edge emphasis amount ΔFz2 using:

$$\Delta Fz2 = Fz2 \times \Delta Fz1 \quad (8)$$

When Fz2 is defined, as shown in FIG. 13B, the process in STEP 1403 can apply edge emphasis to the bold line area to prevent bordering, and can apply stronger edge emphasis to the thin line area than the bold line area to enhance the sharpness and increase the density of a black character.

<Adjusting Process STEP 1404: Adjust Edge Emphasis Amount by Fe>

The CPU 11 adjusts the edge emphasis amount ΔFz2 calculated in STEP 1403 using the edge level Fe defined in STEP 709. The CPU 11 calculates an adjusted edge emphasis amount ΔFe using:

$$\Delta Fe = Fe \times \Delta Fz2 \quad (9)$$

By the process in STEP 1404, the edge area such as a character can undergo relatively strong edge emphasis, and the flat area such as a background or photo can undergo relatively weak edge emphasis. As a result, the sharpness of a character can be enhanced, moiré can be prevented from being emphasized, and a photo can be prevented from being roughened at the same time.

<Adjusting Process STEP 1405: Completion of Edge Emphasis Filter Process>

The CPU 11 calculates an edge emphasis filter process pixel value Ne by adding the edge emphasis amount ΔFe calculated in STEP 1404 to the pixel value N0 of interest, as given by:

$$Ne = N0 + \Delta Fe \quad (10)$$

Note that a process for clipping Ne within a desired range may be inserted.

Effect of First Embodiment

Figure 16A:
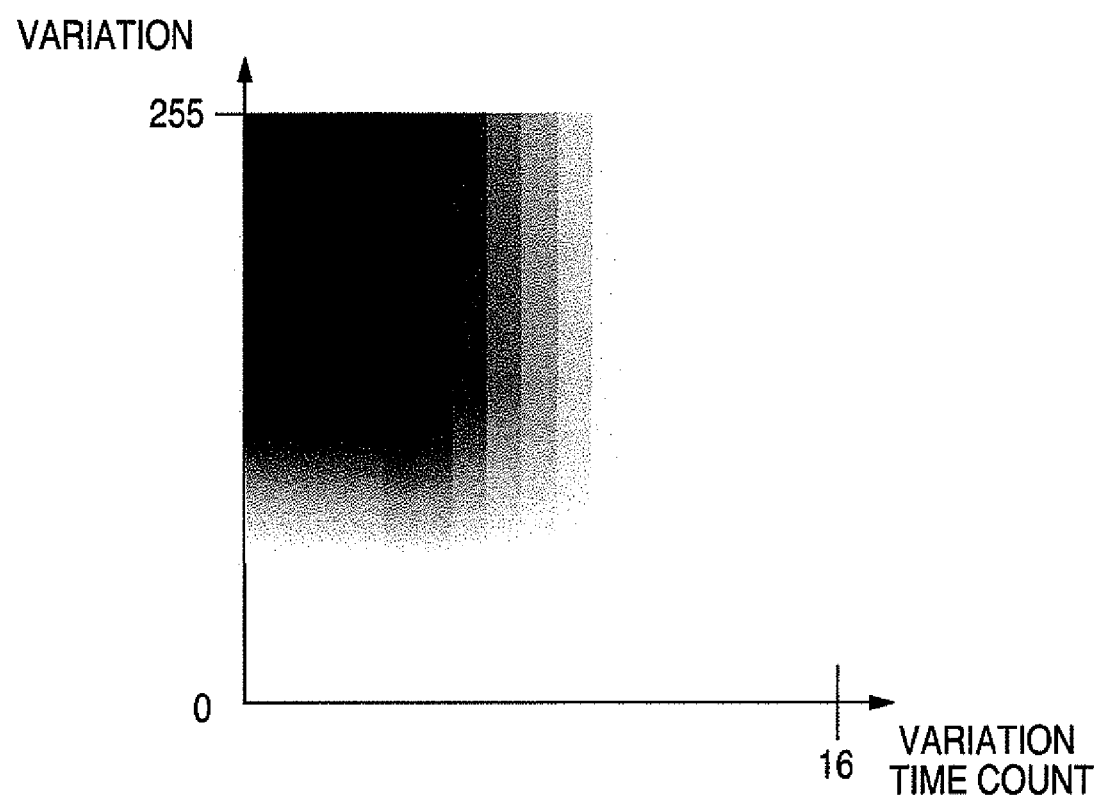
FIGS. 16A and 16B are graphs for explaining the defined edge levels.
Figure 16B:
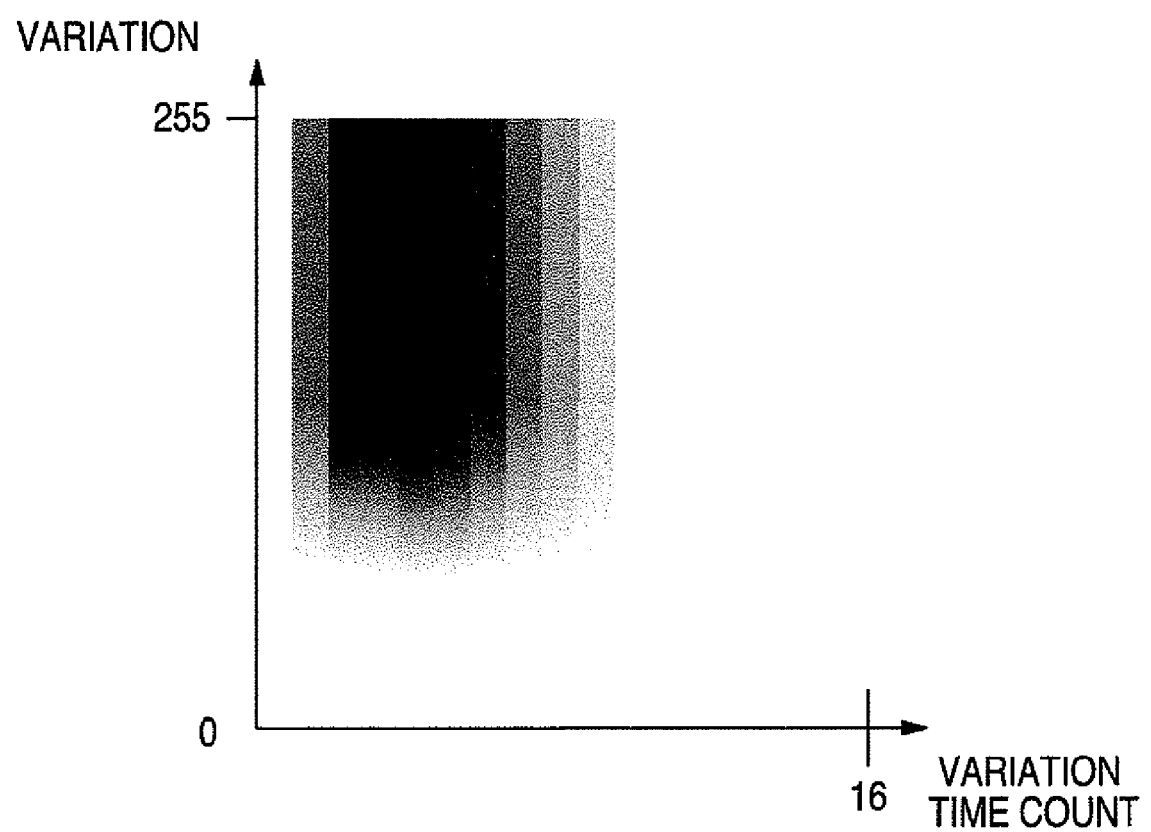

FIGS. 16A and 16B show the adaptive adjusting level defined by the first embodiment with respect to the variation time count and variation. Note that the adjusting level shown in FIGS. 16A and 16B is a level (Fz1×Fz2×Fe) upon applying all of Fz1, Fz2, and Fe. FIG. 16A shows the definition when the bold line area is to be bordered, and FIG. 16B shows the definition when the bold line area is not to be bordered. That is, FIGS. 16A and 16B show that the adjusting level becomes stronger with increasing density. In the prior art, the adjusting level cannot be adaptively defined in accordance with the variation time count. However, as shown in FIGS. 16A and 16B, the adjusting level can be adaptively defined in accordance with the variation time count.

Since the adjusting level can be changed according to not only the variation but also the variation time count, bad effects of moiré by edge emphasis to a halftone area can be eliminated. Furthermore, since the adjusting level can be adaptively defined according to the variation time count, bad effects of switching of processes due to the variation time count can be eliminated. Since the adjusting level can be adaptively defined according to the variation time count and variation, bad effects of switching of processes due to the variation time count and variation can be eliminated.

Figure 17A:
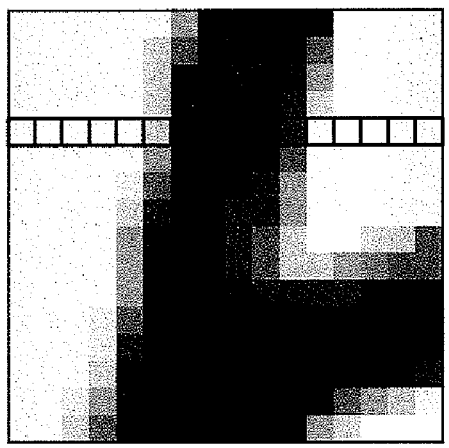
FIGS. 17A to 17F are explanatory views of images before and after edge emphasis.
Figure 17B:
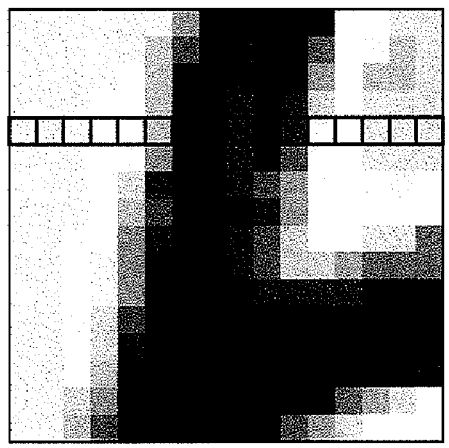

FIGS. 17A to 17F show images before and after edge emphasis upon scanning a document at a resolution of 600 dpi. FIGS. 17A and 17B show a part of "5" at a size of 7 pt before and after edge emphasis. FIGS. 18A and 18B respectively correspond to FIGS. 17A and 17B, and show image signals of 16 pixels shown in FIGS. 17A and 17B.

Figure 17C:
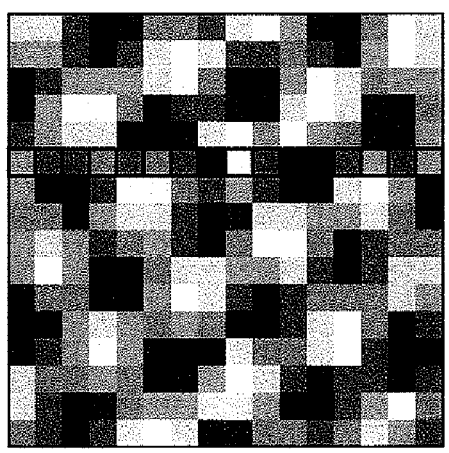
Figure 17D:
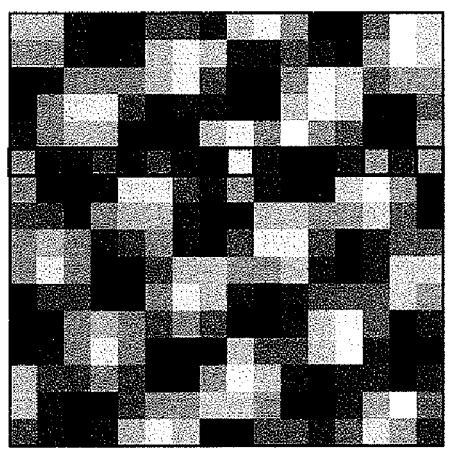

FIGS. 17C and 17D express a 50% density using a halftone dot screen with 150 LPI and a screen angle of 30°, before and after edge emphasis. FIGS. 18C and 18D respectively correspond to FIGS. 17C and 17D, and show image signals of 16 pixels shown in FIGS. 17C and 17D.

Figure 17E:
Figure 17F:

FIGS. 17E and 17F show photos that express a part of the human eye, before and after edge emphasis. FIGS. 18E and 18F respectively correspond to FIGS. 17E and 17F, and show image signals of 16 pixels shown in FIGS. 17E and 17F.

As shown in FIGS. 17A to 17F and FIGS. 18A to 18F, emphasis of image signals of text edges, that of halftone edges weaker than the text edges, and that of photo edges weaker than text edges can be attained at the same time.

Second Embodiment

The first embodiment has exemplified the case in which the edge emphasis process by means of the filter process is executed at the adaptive level. The second embodiment will exemplify a case in which edge emphasis and smoothing processes are executed at the adaptive level.

Figure 19:
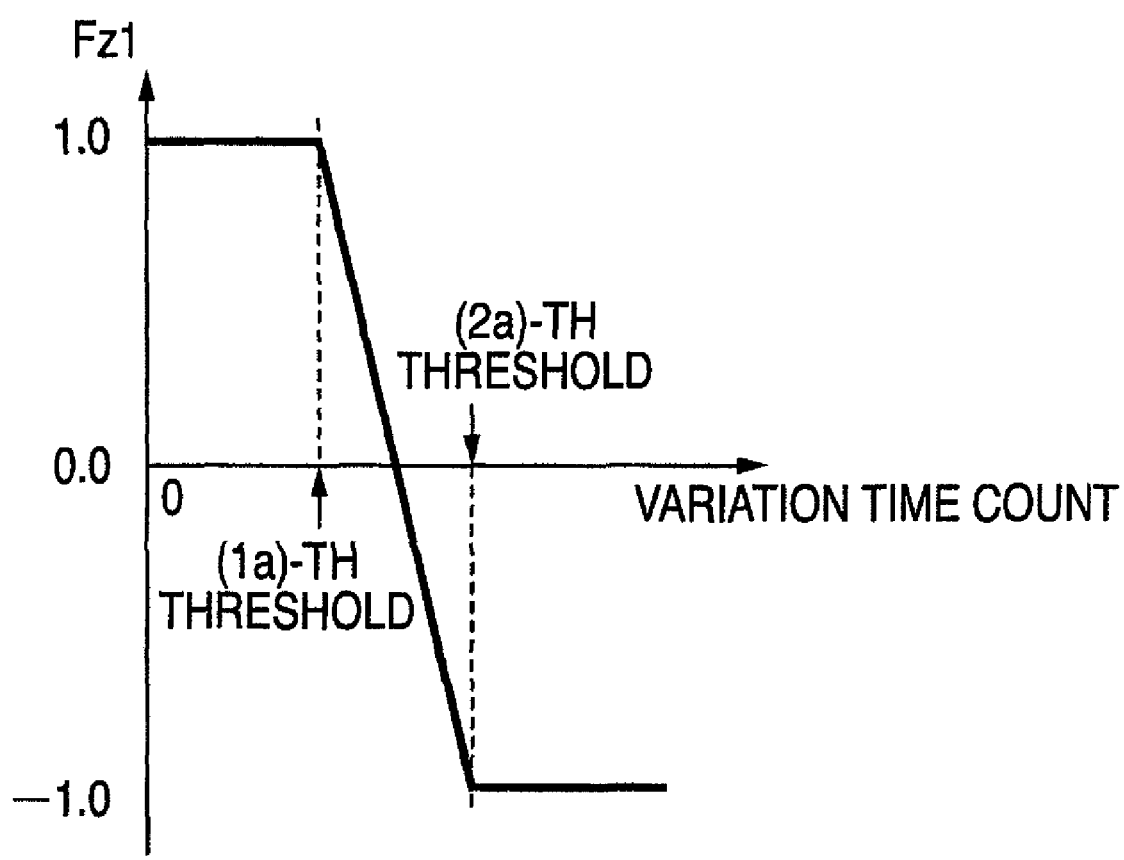
FIG. 19 is a graph for explaining the edge level defining process including a smoothing process.

In STEP 707 of the first embodiment, an edge level Fz1 shown in FIG. 19 is used in place of that shown in FIG. 13A. Fz1 in FIG. 19 is characterized by also having a − level. If the level is +, Fz1 has an effect of emphasizing an edge; if the level is −, Fz1 has an effect of weakening (smoothing) an edge. By setting a − level for the variation time count with which a halftone area is more likely to be determined (that larger than a (2a)-th threshold), as shown in FIG. 19, the halftone area can be smoothed. More specifically, the first embodiment avoid moiré due to halftone dots from being emphasized, while the second embodiment can eliminate moiré.

Figure 20:
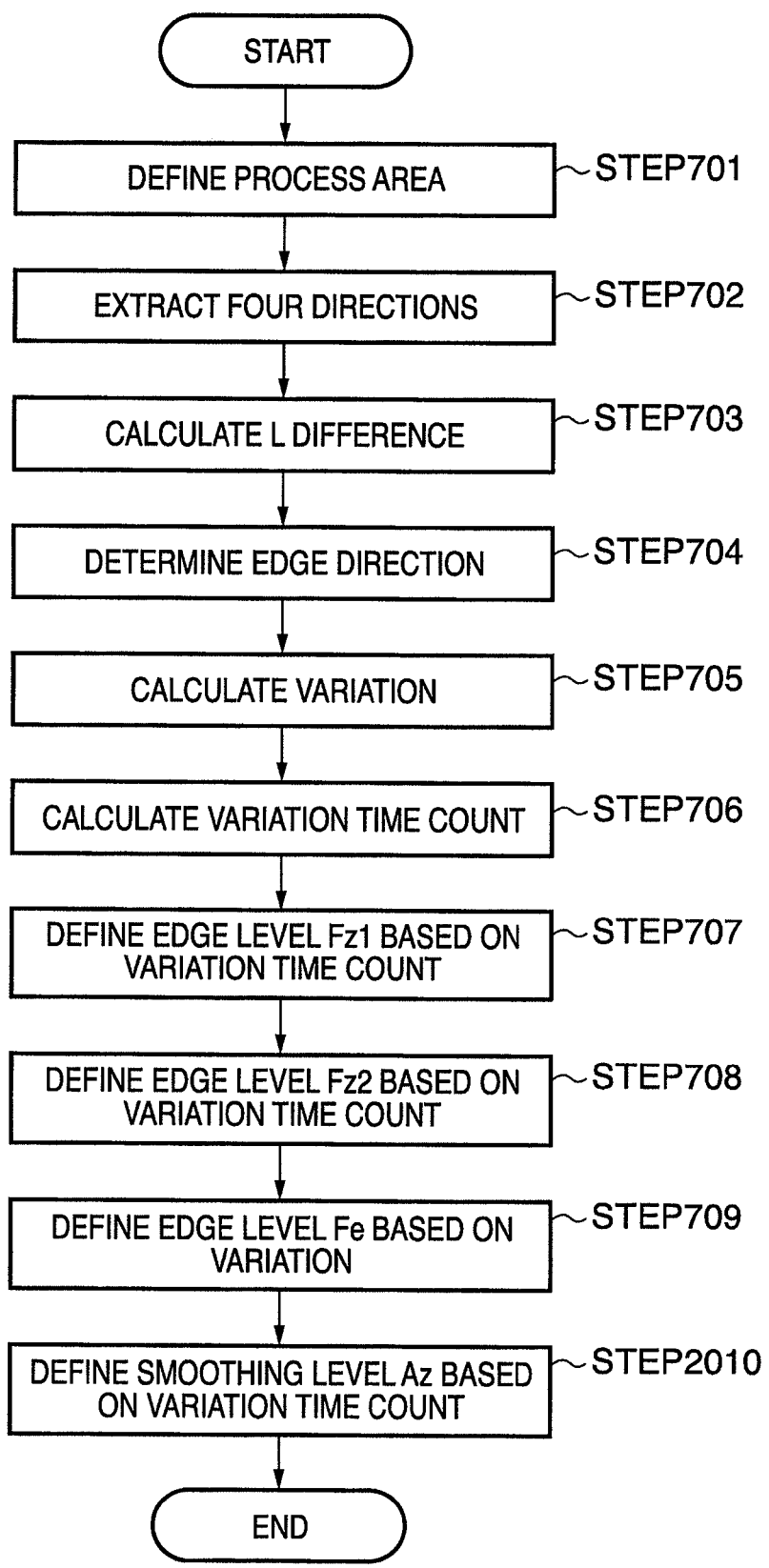
FIG. 20 is a flowchart of an adjusting level defining process according to the second embodiment.

Another smoothing example will be described below. FIG. 20 is a flowchart of an adjusting level defining process according to the second embodiment. Note that some processes are the same as those explained using FIG. 7. Hence, the same step numbers denote the same processes, and a repetitive description thereof will not be given.

<Adjusting Level Defining STEP 2010: Define Smoothing Level Based on Variation Time Count>

Figure 21:
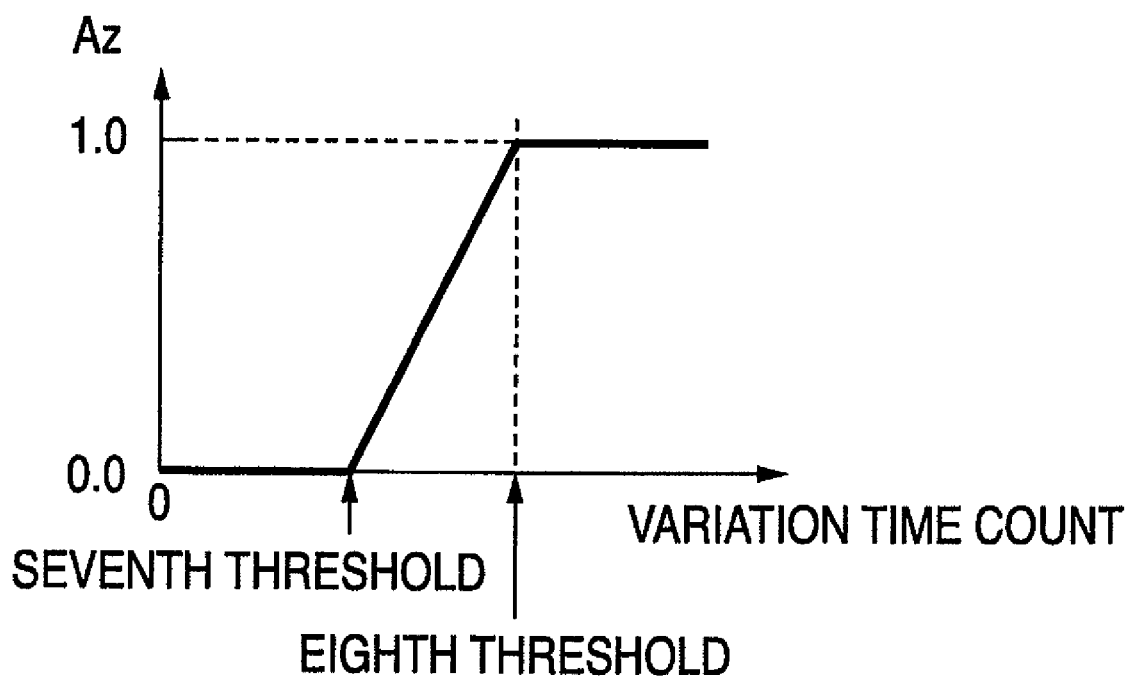
FIG. 21 is a graph for explaining a smoothing level defining process.

The CPU 11 adaptively defines a smoothing level Az in accordance with the variation time count calculated in STEP 706. FIG. 21 is a graph for explaining the Az defining process in STEP 2010: the abscissa plots the variation time count, and the ordinate plots Az. In case of the variation time count which is smaller than a seventh threshold and with which a text area is more likely to be determined, Az is defined to be zero so as not to apply smoothing. In case of the variation time count which is larger than an eighth threshold and with which a halftone area is more likely to be determined, Az is set to be 1 so as to apply smoothing. In case of the variation time count falling within the range between the seventh and eighth thresholds (both inclusive), Az, which progressively change for respective variation time counts, is adaptively defined, so that Az=0 when the variation time count=the seventh threshold and Az=1 when the variation time count=the eighth threshold. In this way, switching of processes can be obscured. More specifically, the CPU 11 can adaptively set Az with reference to FIG. 21 or using:

$$Az=(\text{eighth threshold}-\text{variation time count})/(\text{eighth threshold}-\text{seventh threshold}) \quad (11)$$

Figure 22:
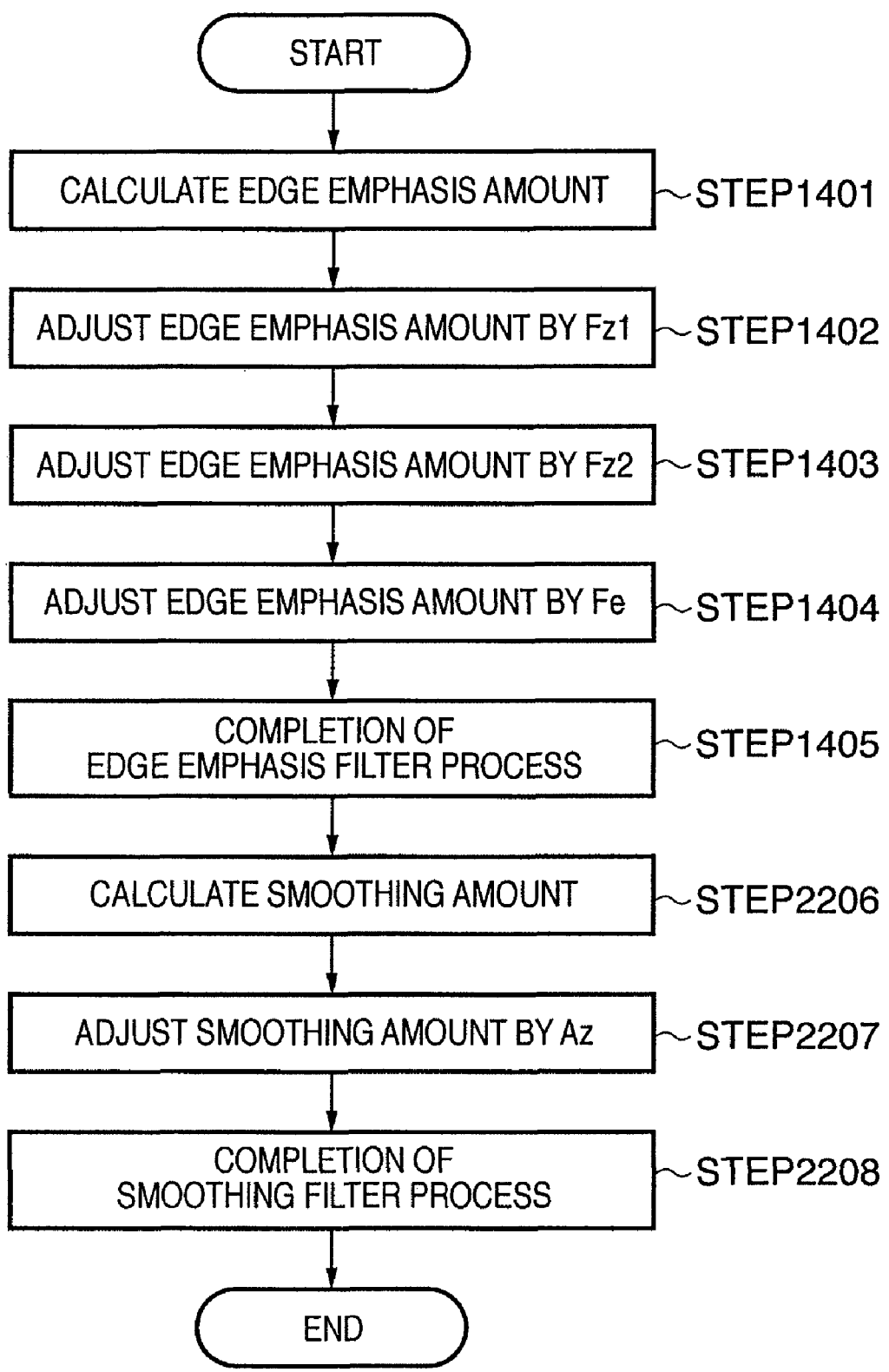
FIG. 22 is a flowchart of an adjusting process according to the second embodiment.

FIG. 22 is a flowchart of the adjusting process according to the second embodiment. Note that some processes are the same as those explained using FIG. 14. Hence, the same step numbers denote the same processes, and a repetitive description thereof will not be given.

<Adjusting Process STEP 2206: Calculate Smoothing Amount>

The CPU 11 calculates change amounts (smoothing amounts) between the pixel value of interest upon applying a smoothing filter and that before application for respective colors in the 7×7 RGB areas defined in STEP 701. This embodiment will exemplify a case in which a 5×5 smoothing filter is applied to have the pixel of interest as the center. However, the filter size need only be smaller than the process area size defined in STEP 701, and filter coefficients may be appropriately defined. FIG. 23A shows an example of filter coefficients of a 5×5 smoothing filter. Let N0 be a pixel value of interest, N2 be a pixel value of interest as a result of application of the filter in FIG. 23A, and ΔA be a smoothing amount. ΔA can be calculated by:

$$\Delta A = N2 - N0 \quad (12)$$

As shown in FIG. 23B, when the filter coefficient of the pixel of interest is defined to be a value obtained by subtracting the filter total value in FIG. 23A from the filter coefficient at the position of the pixel of interest in FIG. 23A, ΔA can be calculated by only applying FIG. 23B.

<Adjusting Process STEP 2207: Adjust Smoothing Amount by Az>

The CPU 11 adjusts the smoothing amounts ΔA calculated in STEP 2206 using the smoothing level Az defined in STEP 2010. The CPU 11 calculates an adjusted smoothing amount ΔAz using:

$$\Delta Az = Az \times \Delta A \quad (13)$$

By the process in STEP 2207, the text area with a small variation time count undergoes relatively weak smoothing so as not to impair sharpness, and the halftone area with a large variation time count undergoes relatively strong smoothing so as to eliminate moiré.

<Adjusting Process STEP 2208: Completion of Smoothing Filter Process>

The CPU 11 calculates a filter-processed pixel value Nf by adding the smoothing amount ΔAz calculated in STEP 2207 to the edge emphasis filter-processed pixel value Ne, as given by:

$$Nf = Ne + \Delta Az \quad (14)$$

Note that a process for clipping Nf within a desired range may be inserted.

Effect of Second Embodiment

The first embodiment has an effect of preventing moiré from being emphasized, since edge emphasis can be suppressed for a halftone area with a relatively large variation time count. However, when moiré has already occurred before the image adjusting process, moiré can be prevented from being worsened any further upon execution of the first embodiment, but it is difficult to eliminate moiré. Since the second embodiment can strongly apply smoothing to the halftone area with a relatively large variation time count, moiré can be effectively eliminated compared to the first embodiment. Since this embodiment can weaken smoothing to be applied to the text area with a small variation time count, the sharpness of characters is never impaired. Like in the conventional process, when an image is separated into halftone and text areas, and when smoothing is applied to the halftone area and is not applied to the text area, if a part of the halftone area is determined as a halftone area, and its remaining part is determined as a text part, switching of the smoothing processes becomes conspicuous on an image. Since the second embodiment can adaptively define the smoothing level which progressively changes according to the variation time count, switching of the smoothing processes as an issue of the conventional process can be obscured.

Third Embodiment

Figure 24A:
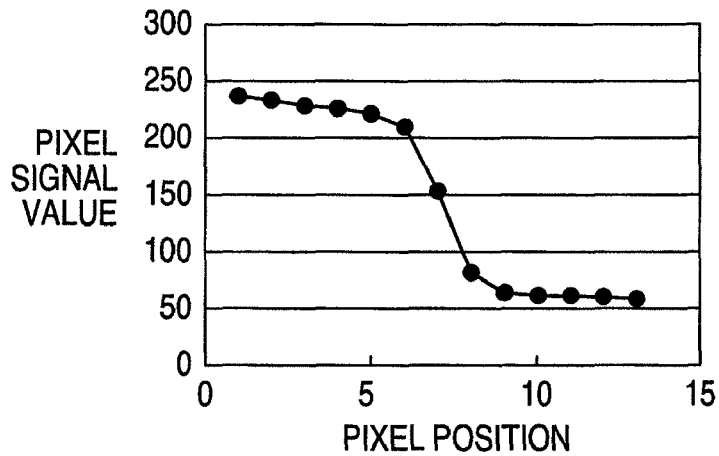
FIGS. 24A to 24C are graphs for explaining an edge emphasis process.
Figure 24B:
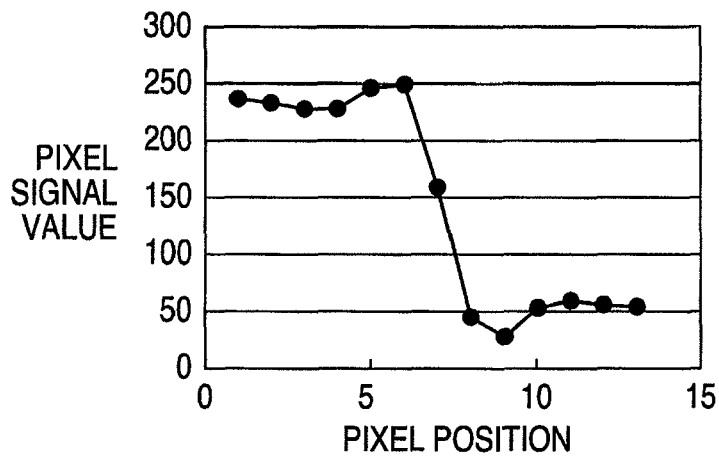

The first embodiment has exemplified the case in which the edge emphasis process by means of the filter process is executed at the adaptive level. FIG. 24A shows the pixel values of an image signal G obtained by scanning a document, on which a black vertical line is drawn on a white background, from the white background to the black vertical line. When the same values as those in FIG. 24A line up in the vertical direction of an image, if the first embodiment is practiced using the filter shown in FIG. 15A or 15B at the level of Fz1=Fz2=Fe=1, the image signal shown in FIG. 24A is converted into that shown in FIG. 24B. In FIG. 24B, the edge of the image signal is emphasized compared to FIG. 24A, but the image signal in FIG. 24B has an intermediate value in the edge unlike in FIG. 24C. The third embodiment will exemplify a case in which a substitution process is executed at an adaptive level to be close to FIG. 24C in addition to the edge emphasis of the first embodiment, thus applying further edge emphasis.

Figure 25:
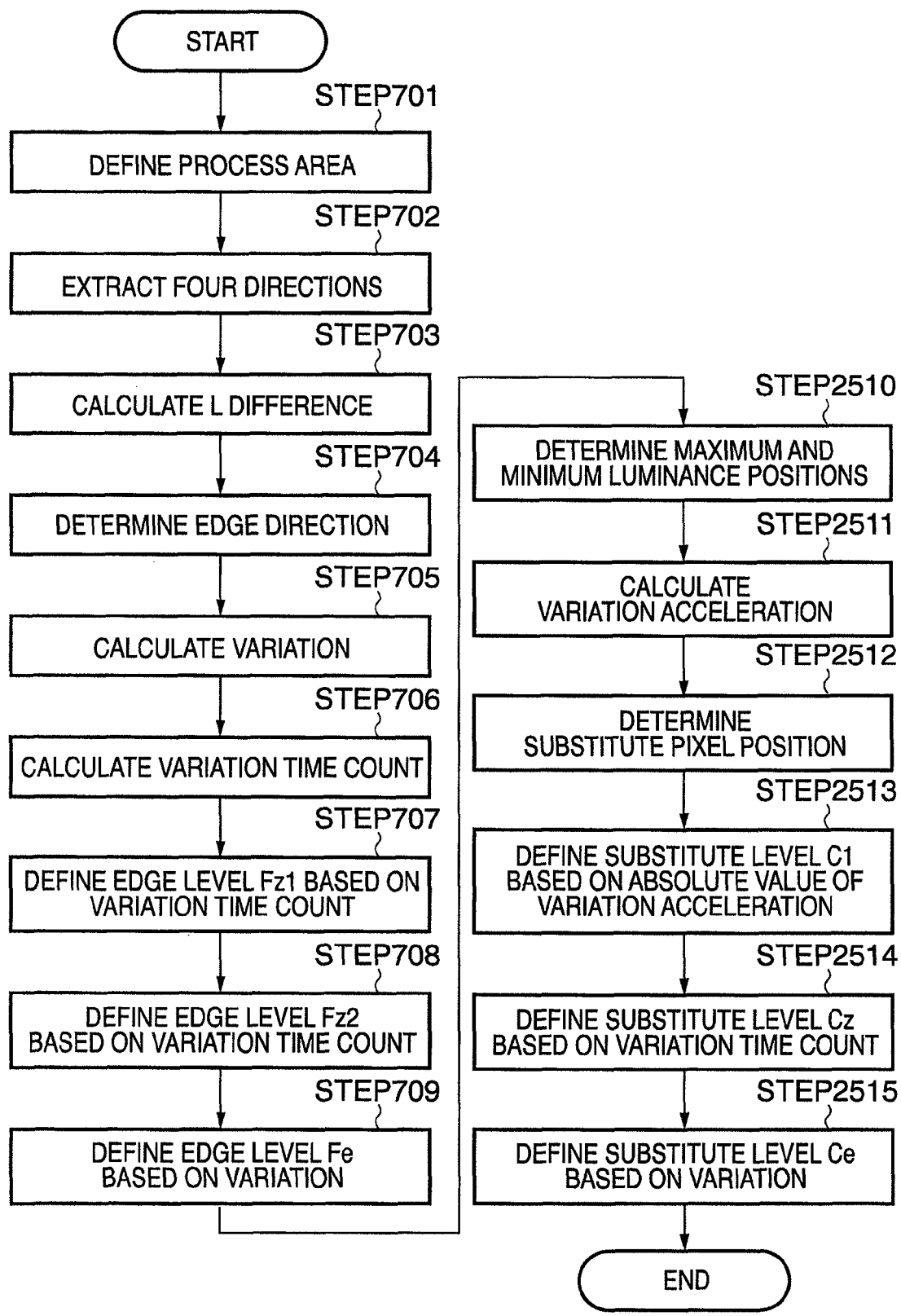
FIG. 25 is a flowchart of an adjusting level defining process according to the third embodiment.

FIG. 25 is a flowchart of the adjusting level defining process according to the third embodiment. Note that some processes are the same as those explained using FIG. 7. Hence, the same step numbers denote the same processes, and a repetitive description thereof will be avoided. Also, this embodiment may be combined with the second embodiment.

<Adjusting Level Defining STEP 2510: Determine Maximum and Minimum Luminance Positions>

The CPU 11 determines pixel positions with maximum L and minimum L from seven pixels of L in the edge direction determined in STEP 704 of the four directions extracted in STEP 702.

<Adjusting Level Defining STEP 2511: Calculate Variation Acceleration>

Figure 8E:
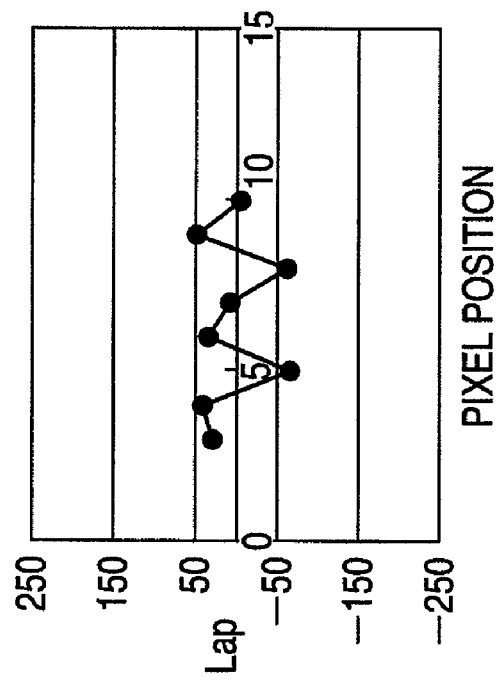
Figure 8F:
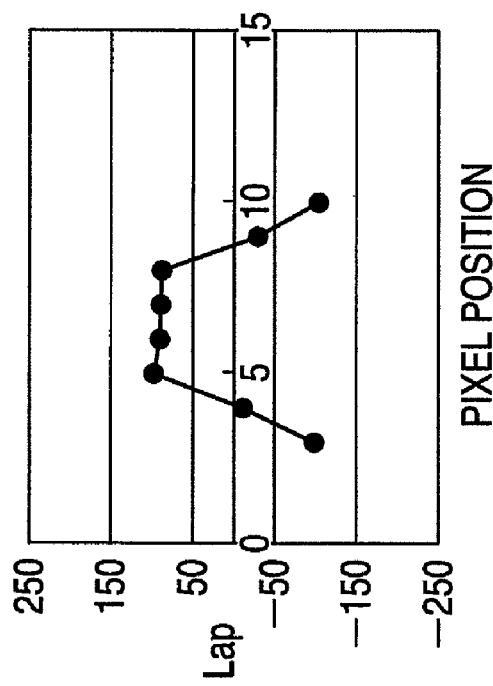

The CPU 11 calculates a variation acceleration Lap of three pixels from Grd of the edge direction calculated in STEP 703 in the edge direction determined in STEP 704. The CPU 11 calculates the variation acceleration by:

$$Lap(i)=Grd(i+1)-Grd(i-1) \qquad (15)$$

where Grd(i−1) is a pixel before pixel Grd(i), and Grd(i+1) is a pixel after that pixel. FIGS. 8E and 8F respectively show Lap calculated by applying equation (15) to Grd shown in FIGS. 8C and 8D.

Note that the calculation method of the variation acceleration is not limited to this. For example, a difference between neighboring Grd data may be calculated.

<Adjusting Level Defining STEP 2512: Determine Substitute Pixel Position>

The CPU 11 determines a substitute pixel position based on the pixel positions with maximum L and minimum L determined in STEP 2510 and the variation accelerations Lap calculated in STEP 2511. As shown in FIGS. 8A to 8F, when the sign of Lap is +, L of the pixel of interest tends to assume a value, the absolute value of which is closer to minimum L than to maximum L; when the sign of Lap is −, L of the pixel of interest tends to assume a value, the absolute value of which is closer to maximum L than to minimum L. Hence, as shown in Table 1 below, the CPU 11 determines a substitute pixel position with respect to the sign of Lap to substitute the pixel position. If the CPU 11 substitutes the pixel positions, FIG. 24C can be realized. Note that in the third embodiment, the CPU 11 determines the substitute pixel position, as shown in Table 1. However, handling of the edge center at which Lap of the pixel of interest becomes zero is not limited to Table 1. If Lap of the pixel of interest is zero, that pixel position may be substituted by that of maximum L or by that of minimum L.

TABLE 1

Relationship between secondary derivative sign and substitute pixel position

| Lap Sign of Pixel of Interest | Total Lap Sign of Previous and Next Pixels | Substitute Pixel Position |
|---|---|---|
| + | | Minimum L |
| − | | Maximum L |
| 0 | + | Minimum L |
| 0 | − | Maximum L |
| 0 | 0 | Maximum L |

<Adjusting Level Defining STEP 2513: Define Substitute Level Based on Absolute Value of Variation Acceleration>

Figure 24C:
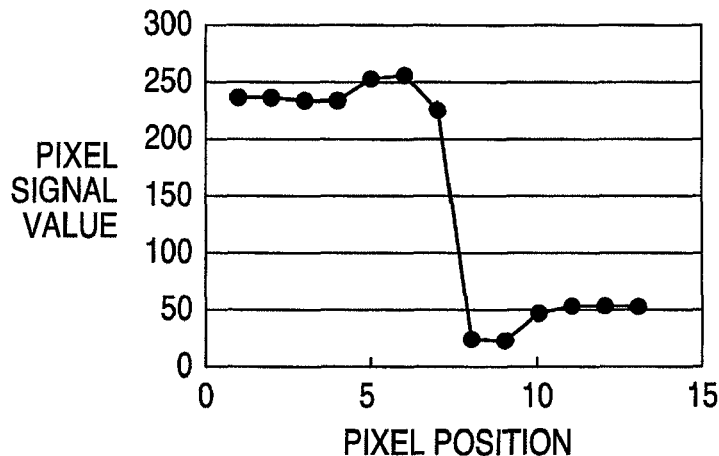

The CPU 11 adaptively defines a substitute level C1 in accordance with the absolute value of the variable acceleration calculated in STEP 2511. FIG. 24C can be obtained by defining C1=1 irrespective of the absolute value of the variation acceleration. However, if C1=1 is always defined, jaggy often stands out. Hence, a substation example that can suppress jaggy and can emphasize an edge more than FIG. 24B will be explained.

Figure 26A:
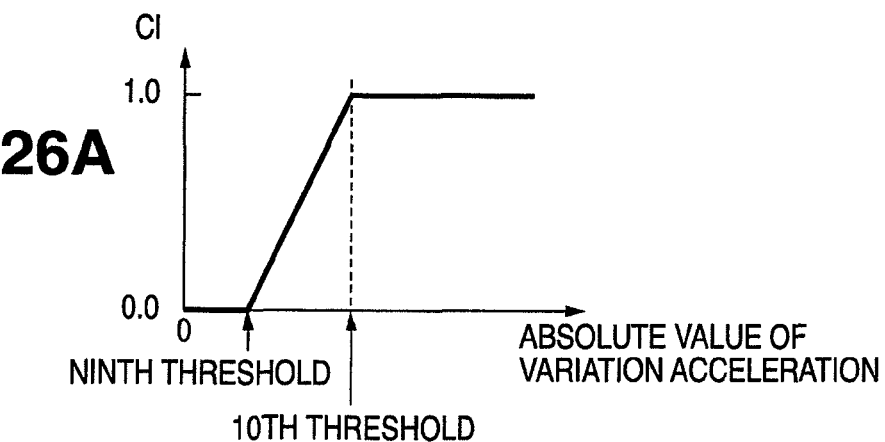
FIGS. 26A to 26C are graphs for explaining a substitute level defining process.

FIG. 26A is a graph for explaining the C1 defining process in STEP 2513: the abscissa plots the absolute value of the variation acceleration, and the ordinate plots C1. In case of the variation acceleration which is near the edge center and is smaller than a ninth threshold, C1 is defined to be zero so as not to substitute the pixel position. The reason why the pixel position near the edge center is not substituted is to obscure generation of jaggy. In case of the absolute value of the variation acceleration which is separated away from the edge center and is larger than a 10th threshold, C1 is defined to be 1 to substitute the pixel position. In case of the absolute value of the variation acceleration falling within the range between the ninth and 10th thresholds (both inclusive), C1, which progressively changes for respective absolute values of the variation accelerations, is adaptively defined, so that C1=0 when the absolute value of the variation acceleration=the ninth threshold and C1=1 when the absolute value of the variation acceleration=the 10th threshold. As a result, switching of the processes can be obscured. More specifically, the CPU 11 can adaptively define C1 with reference to FIG. 26A or using:

$$C1 = (\text{absolute value of variation acceleration} - \text{ninth threshold})/(\text{10th threshold} - \text{ninth threshold}) \qquad (16)$$

<Adjusting Level Defining STEP 2514: Define Substitute Level Based on Variation Time Count>

Figure 26B:
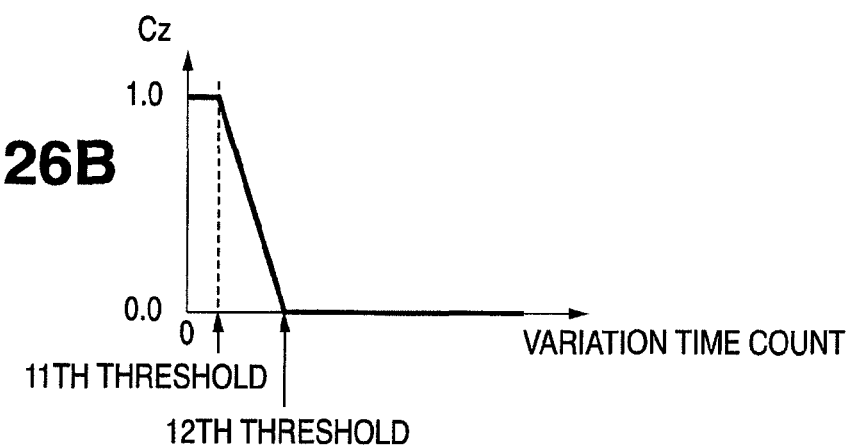

The CPU 11 adaptively defines a substitute level Cz in accordance with the variation time count calculated in STEP 706. The CPU 11 adaptively defines Cz based on characteristics shown in FIG. 26B using 11th and 12th thresholds, as in STEP 707. In case of a bold line area, the variation time count of which is smaller than the 11th threshold, Cz=1. In case of a thin line or halftone area, the variation time count of which is larger than the 12th threshold, Cz=0. In case of the variation time count falling within the range between the 11th and 12th thresholds (both inclusive), Cz can be adaptively defined using:

$$Cz = (\text{12th threshold} - \text{variation time count})/(\text{12th threshold} - \text{11th threshold}) \qquad (17)$$

<Adjusting Level Defining STEP 2515: Define Substitute Level Based on Variation>

Figure 26C:
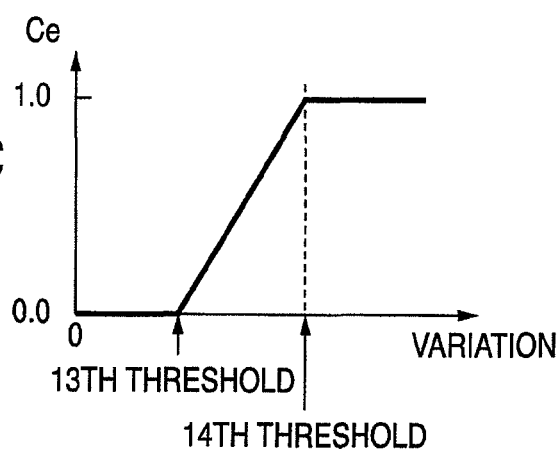

The CPU 11 adaptively defines a substitute level Ce in accordance with the variation calculated in STEP 705. The CPU 11 adaptively defines Ce based on characteristics shown in FIG. 26C using 13th and 14th thresholds as in STEP 709. If the variation is smaller than the 13th threshold, Ce=0. If the variation is larger than the 14th threshold, Ce=1. If the variation falls within the range between the 13th and 14th thresholds (both inclusive), Ce can be adaptively defined using:

$$Ce = (\text{variation} - \text{13th threshold})/(\text{14th threshold} - \text{13th threshold}) \qquad (18)$$

Figure 27:
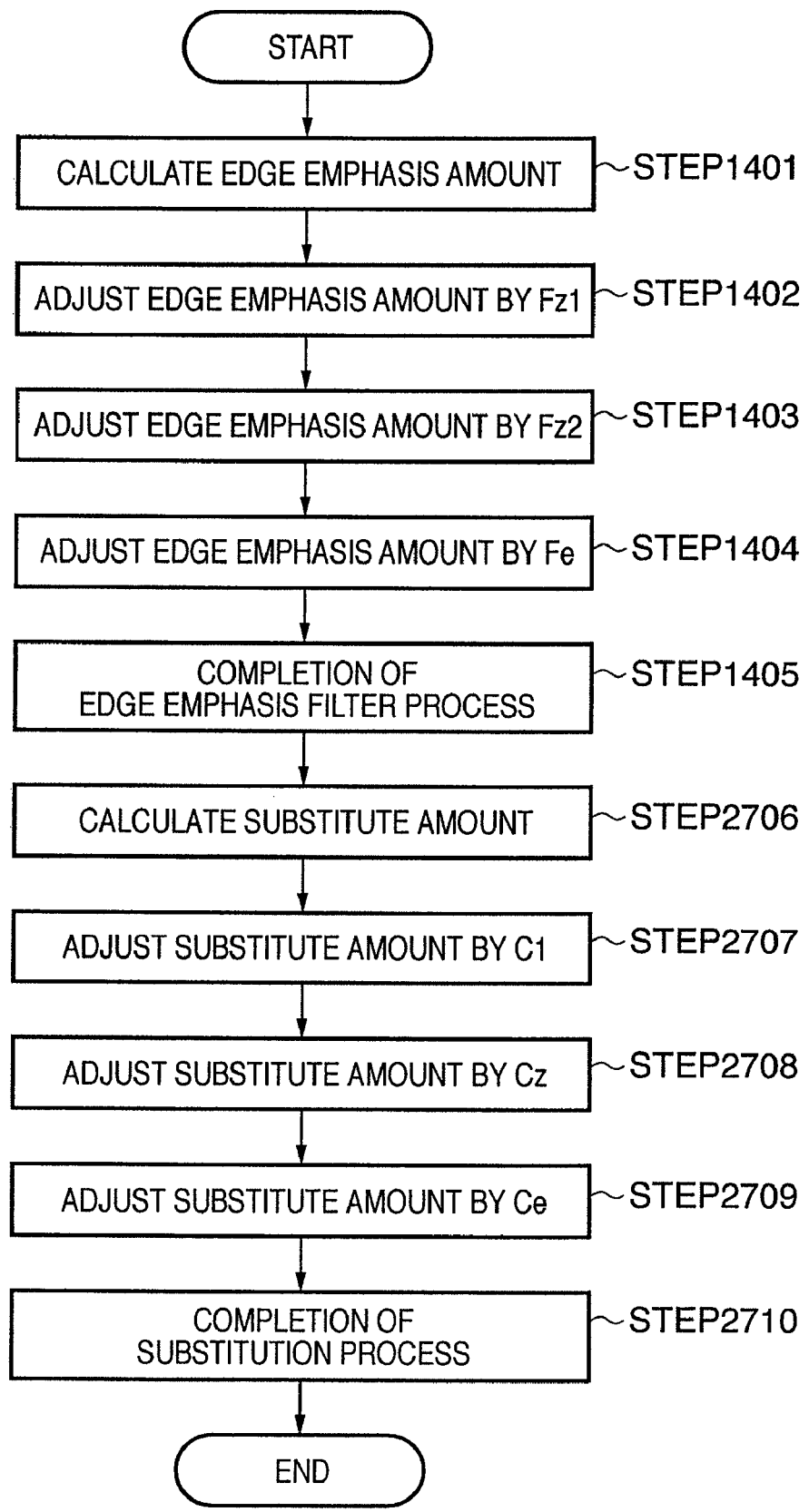
FIG. 27 is a flowchart of an adjusting process according to the third embodiment.

FIG. 27 is a flowchart of the adjusting process according to the third embodiment. Since STEPS 2701 to 2705 in FIG. 27 are the same as STEPS 1401 to 1405 in FIG. 14 that have already been explained in the first embodiment, a repetitive description thereof will not be given. STEPS different from the first embodiment will be explained.

<Adjusting Process STEP 2706: Calculate Substitute Amount>

The CPU 11 calculates a substitute amount using the pixel value at the substitute pixel position determined in STEP 2512. The CPU 11 extracts RGB values at the substitute pixel position determined in STEP 2512 from the 7×7 RGB areas defined in STEP 701. Let N0 be the pixel value of interest, C0 be the pixel value at the substitute pixel position, and ΔC be the substitute amount. Then, ΔC can calculated using:

$$\Delta C = C0 - N0 \quad (19)$$

<Adjusting Process STEP 2707: Adjust Substitute Amount by C1>

The CPU 11 adjusts the substitute amount ΔC calculated in STEP 2706 by the substitute level C1 defined in STEP 2513. The CPU 11 calculates the adjusted substitute amount ΔC1 using:

$$\Delta C1 = C1 \times \Delta C \quad (20)$$

By the process in STEP 2707, the substitution that suppresses generation of jaggy can be applied.

<Adjusting Process STEP 2708: Adjust Substitute Amount by Cz>

The CPU 11 adjusts the substitute amount ΔC1 calculated in STEP 2707 by the substitute level Cz defined in STEP 2514. The CPU 11 calculates the adjusted substitute amount ΔCz using:

$$\Delta Cz = Cz \times \Delta C1 \quad (21)$$

By the process in STEP 2708, the substitution that can suppress generation of jaggy can be applied by strengthening the substitute level for the bold line area, and by weakening that for the thin line area.

<Adjusting Process STEP 2709: Adjust Substitute Amount by Ce>

The CPU 11 adjusts the substitute amount ΔCz calculated in STEP 2708 by the substitute level Ce defined in STEP 2515. The CPU 11 calculates the adjusted substitute amount ΔCe using:

$$\Delta Ce = Ce \times \Delta Cz \quad (22)$$

By the process in STEP 2709, an edge area of a character or the like is relatively strongly substituted to enhance sharpness, and a flat area is relatively weakly substituted to prevent roughening.

<Adjusting Process STEP 2710: Completion of Substitution Process>

The CPU 11 calculates a pixel value Nc of interest edge-emphasized by means of filtering and substitution by adding the substitute amount ΔCe calculated in STEP 2709 to the edge emphasis filter-processed value Ne of the pixel of interest, as given by:

$$Nc = Ne + \Delta Ce \quad (23)$$

Note that a process for clipping Nc within a desired range may be inserted.

The effects of the aforementioned third embodiment will be described below. Since the edge emphasis process using the substitution process of the third embodiment is executed in addition to that by means of the edge emphasis filter of the first embodiment, an effect of enhancing the sharpness more than the first embodiment can be obtained. When the bold line area is not to be bordered in the first embodiment, it is weakly edge-emphasized. However, the third embodiment can provide an effect of emphasizing an edge more than the first embodiment while preventing bordering. Since a halftone area with a relatively large variation time count can be weakly substituted, moiré is never emphasized. Since a photo area with a relatively small variation is weakly substituted, it can be prevented from being roughened. Since the third embodiment can adaptively define the substitute level according to the variation acceleration, variation time count, and variation, switching of the substitute processes can be obscured on an image compared to application of substitution to a text area extracted by image area separation of text and halftone areas by the prior art.

Fourth Embodiment

The first to third embodiments have explained the edge emphasis process that enhances sharpness and the smoothing process that eliminates moiré so as to eliminate blurring and moiré generated upon scanning a document. However, there is another issue upon scanning a document. Upon scanning a black character by the scanning unit, R, G, and B do not always assume the same values. As a result, a black density drop and an increase in saturation occur. Such drawbacks deteriorate the quality of the black character. This embodiment will explain a process that defines R, G, and B values to be closer to each other obtained by scanning black. The process that defines R, G, and B values to be closer to each other will be referred to as an achromatization process, and the level of the achromatization process will be referred to as an achromatization level hereinafter. In the following description, the achromatization level is adaptively defined as in the first to third embodiments.

Figure 28:
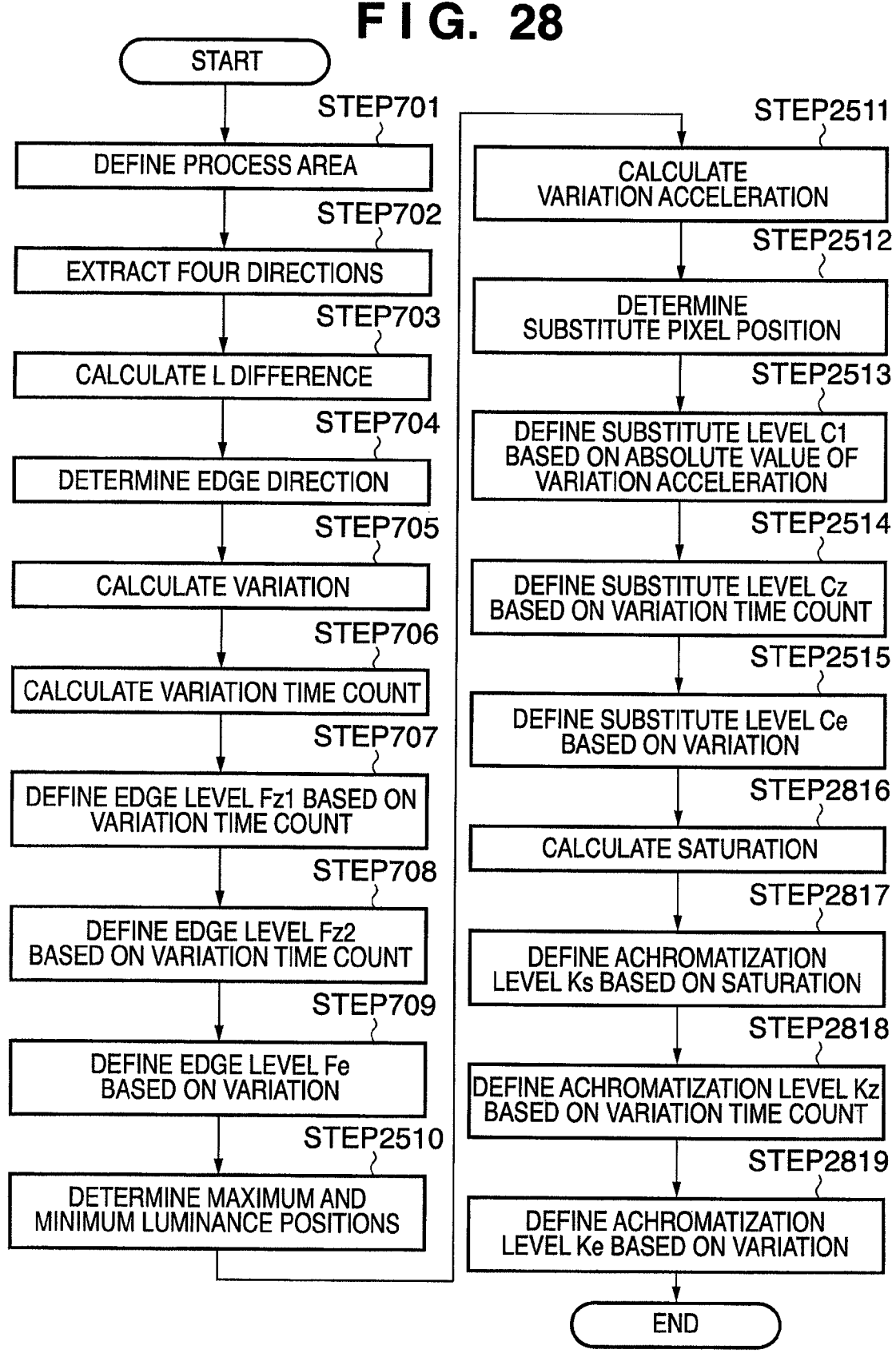
FIG. 28 is a flowchart of an adjusting level defining process according to the fourth embodiment.

FIG. 28 is a flowchart of the adjusting level defining process according to the fourth embodiment. Note that some processes are the same as those in FIG. 25 of the third embodiment. Hence, the same step numbers denote the same processes, and a repetitive description thereof will be avoided. FIG. 28 shows the procedure obtained by adding the fourth embodiment to the third embodiment. Alternatively, the procedure may be obtained by adding the fourth embodiment to the first or second embodiment. STEPS different from the third embodiment will be explained below.

<Adjusting Level Defining STEP 2816: Calculate Saturation>

The CPU 11 calculates a saturation for the pixel of interest of the 7×7 RGB areas defined in STEP 701. The CPU 11 calculates color average values of 3×3 areas having the pixel of interest as the center. Let AR, AG, and AB be the average values of R, G, and B. Then, the CPU 11 calculates, as a saturation, a maximum value of |AR−AG|, |AG−AB|, and |AB−AR|. Note that the present invention is not limited to such specific saturation calculation method. In this case, the saturation is calculated from the averages of the 3×3 areas, but it may be calculated from areas within the process area size defined in STEP 701. This embodiment calculates the color space based on RGB. Alternatively, a block may be converted into a luminance color difference space, and the saturation may be calculated as a distance from the luminance axis using color difference components. Furthermore, the saturation may be calculated based on a value obtained after the edge emphasis and smoothing processes using Nc calculated in the third embodiment.

<Adjusting Level Defining STEP 2817: Define Achromatization Level Based on Saturation>

The CPU 11 adaptively defines an achromatization level Ks in accordance with the saturation calculated in STEP 2816. FIG. 29A is a graph for explaining the Ks defining process in STEP 2817: the abscissa plots the saturation, and the ordinate plots Ks. In case of the saturation which is near the luminance axis and is smaller than a 15th threshold, Ks is defined to be 1 to achromatize the pixel of interest. The reason why the pixel near the luminance axis is achromatized is that a document is more likely to be achromatic since that pixel value is close to the luminance axis. In case of the saturation which is separated away from the luminance axis and is larger than a 16th threshold, Ks is defined to be zero so as not to achromatize the pixel. This is because that pixel is more likely to be a color pixel. In case of the saturation falling within the range between the 15th and 16th thresholds (both inclusive), Ks, which progressively changes for respective saturations, is adaptively defined, so that Ks=1 when the saturation=the 15th threshold and Ks=0 when the saturation=the 16th threshold. As a result, switching of the processes can be obscured. More specifically, the CPU 11 can adaptively define Ks with reference to FIG. 29A or using:

$$Ks=(16\text{th threshold}-\text{saturation})/(16\text{th threshold}-15\text{th threshold}) \quad (24)$$

<Adjusting Level Defining STEP 2818: Define Achromatization Level Based on Variation Time Count>

The CPU 11 adaptively defines an achromatization level Kz in accordance with the variation time count calculated in STEP 706. The CPU 11 adaptively defines Kz based on characteristics shown in FIG. 29B using 17th and 18th thresholds as in STEP 2507. If the variation time count is smaller than the 17th threshold, Kz=1. If the variation time count is larger than the 18th threshold, Kz=0. If the variation time count falls within the range between the 17th and 18th thresholds (both inclusive), Kz can be adaptively defined using:

$$Kz=(18\text{th threshold}-\text{variation time count})/(18\text{th threshold}-17\text{th threshold}) \quad (25)$$

<Adjusting Level Defining STEP 2819: Define Achromatization Level Based on Variation>

The CPU 11 adaptively defines an achromatization level Ke in accordance with the variation calculated in STEP 705. The CPU 11 adaptively defines Ke based on characteristics shown in FIG. 29C using 19th and 20th thresholds as in STEP 2509. If the variation is smaller than the 19th threshold, Ke=0. If the variation is larger than the 20th threshold, Ke=1. If the variation falls within the range between the 19th and 20th thresholds (both inclusive), Ke can be adaptively calculated using:

$$Ke=(\text{variation}-19\text{th threshold})/(20\text{th threshold}-19\text{th threshold}) \quad (26)$$

Figure 30:
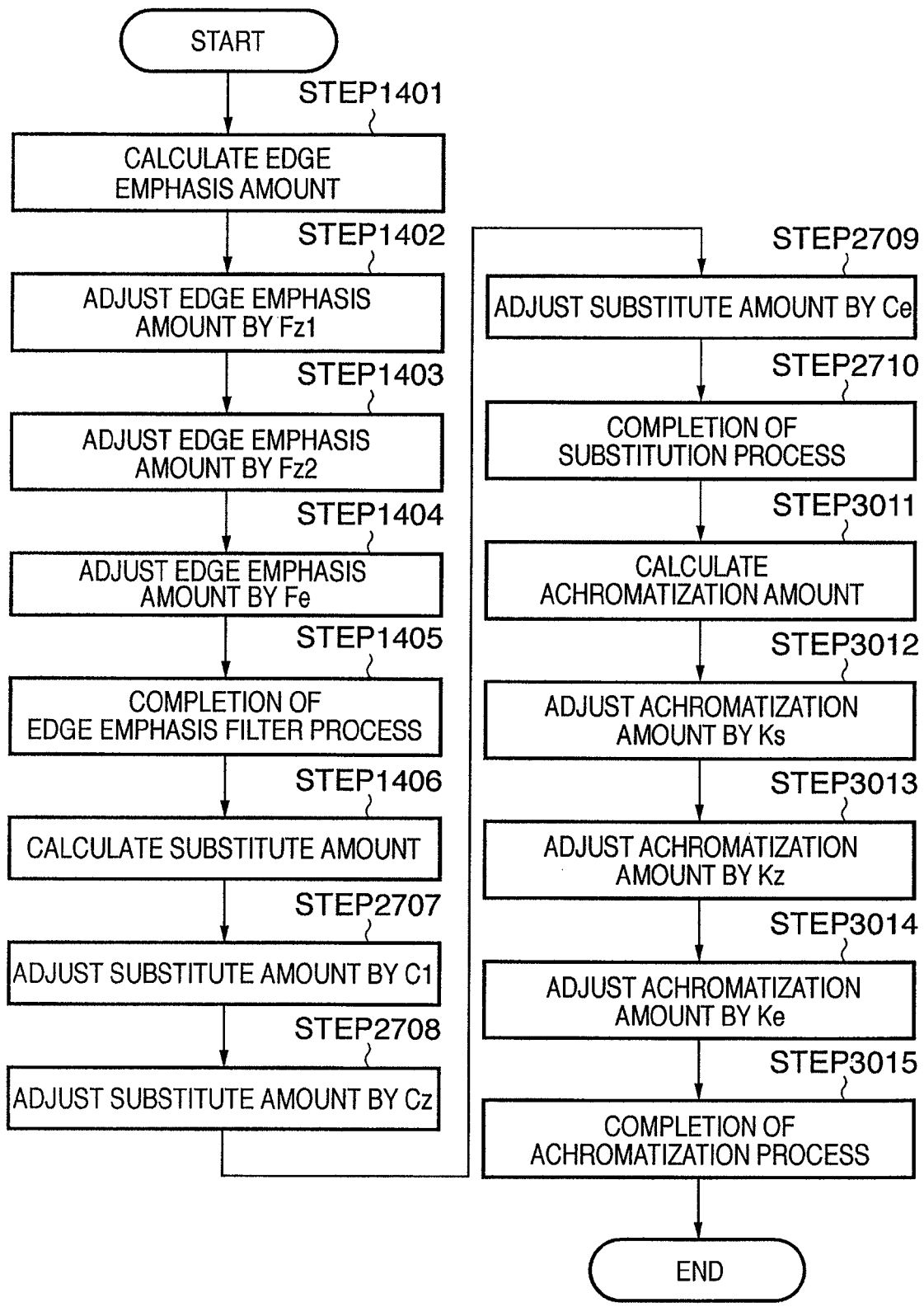
FIG. 30 is a flowchart of an adjusting process according to the fourth embodiment.

FIG. 30 is a flowchart of the adjusting process according to the fourth embodiment. Note that some processes are the same as those FIG. 27 of the third embodiment. Hence, the same step numbers denote the same processes, and a repetitive description thereof will be avoided.

<Adjusting Process STEP 3011: Calculate Achromatization Amount>

The CPU 11 calculates an achromatization amount ΔK using Nc calculated in STEP 2710 by:

$$\Delta K=NcG-NcP \quad (27)$$

where NcG is Nc of a G component, and NcP is Nc of an R or B component.

<Adjusting Process STEP 3012: Adjust Achromatization Amount by Ks>

The CPU 11 adjusts the achromatization amount ΔK calculated in STEP 3011 by the achromatization level Ks defined in STEP 2817. The CPU 11 calculates the adjusted achromatization amount ΔKs using:

$$\Delta Ks=Ks\times\Delta K \quad (28)$$

By the process in STEP 3012, an image signal near the luminance axis can be closer to the luminance axis.

<Adjusting Process STEP 3013: Adjust Achromatization Amount by Kz>

The CPU 11 adjusts the achromatization amount ΔKs calculated in STEP 3012 by the achromatization level Kz defined in STEP 2818. The CPU 11 calculates the adjusted achromatization amount ΔKz using:

$$\Delta Kz=Kz\times\Delta Ks \quad (29)$$

By the process in STEP 3013, relatively strong achromatization is applied to a text area with a smaller variation time count to blacken a character, and relatively weak achromatization is applied to halftone and photo areas with a larger variation time count to suppress a change in tint.

<Adjusting Process STEP 3014: Adjust Achromatization Amount by Ke>

The CPU 11 adjusts the achromatization amount ΔKz calculated in STEP 3013 by the achromatization level Ke defined in STEP 2819. The CPU 11 calculates the adjusted achromatization level ΔKe using:

$$\Delta Ke=Ke\times\Delta Kz \quad (30)$$

By the process in STEP 3014, strong achromatization is applied to an edge area of a character to blacken the character, and weak achromatization is applied to an image with a relatively weak edge like a photo to suppress a change in tint.

<Adjusting Process STEP 3015: Completion of Achromatization Process>

The CPU 11 calculates a pixel value Nk of interest that has undergone the filter process, substitution process, and achromatization process by adding the achromatization amount ΔKe calculated in STEP 3014 to the pixel value Nc of interest edge-emphasized by means of filtering and substation, as given by:

$$Nk=Nc+\Delta Ke \quad (31)$$

Note that a process for clipping Nk within a desired range may be inserted.

Effect of Fourth Embodiment

The first to third embodiments can provide an effect of enhancing the sharpness. However, these embodiments cannot make the values of image signals of respective colors be close to the same value, and a black character cannot appear to gleam black. Since the fourth embodiment can adaptively achromatize the pixel of interest according to the saturation, it can provide an effect with which a black character with a pixel value near the luminance axis has quality to gleam black. Since the achromatization level can be changed according to the variation time count and variation, only a text area may be achromatized, so that tints of halftone and photo areas are left unchanged. Since the fourth embodiment can set an achromatization level according to the saturation, variation time count, and variation, switching of the achromatization processes can be obscured on an image compared to application of achromatization after image area separation of text and achromatic areas in the conventional process.

Fifth Embodiment

Figure 31:
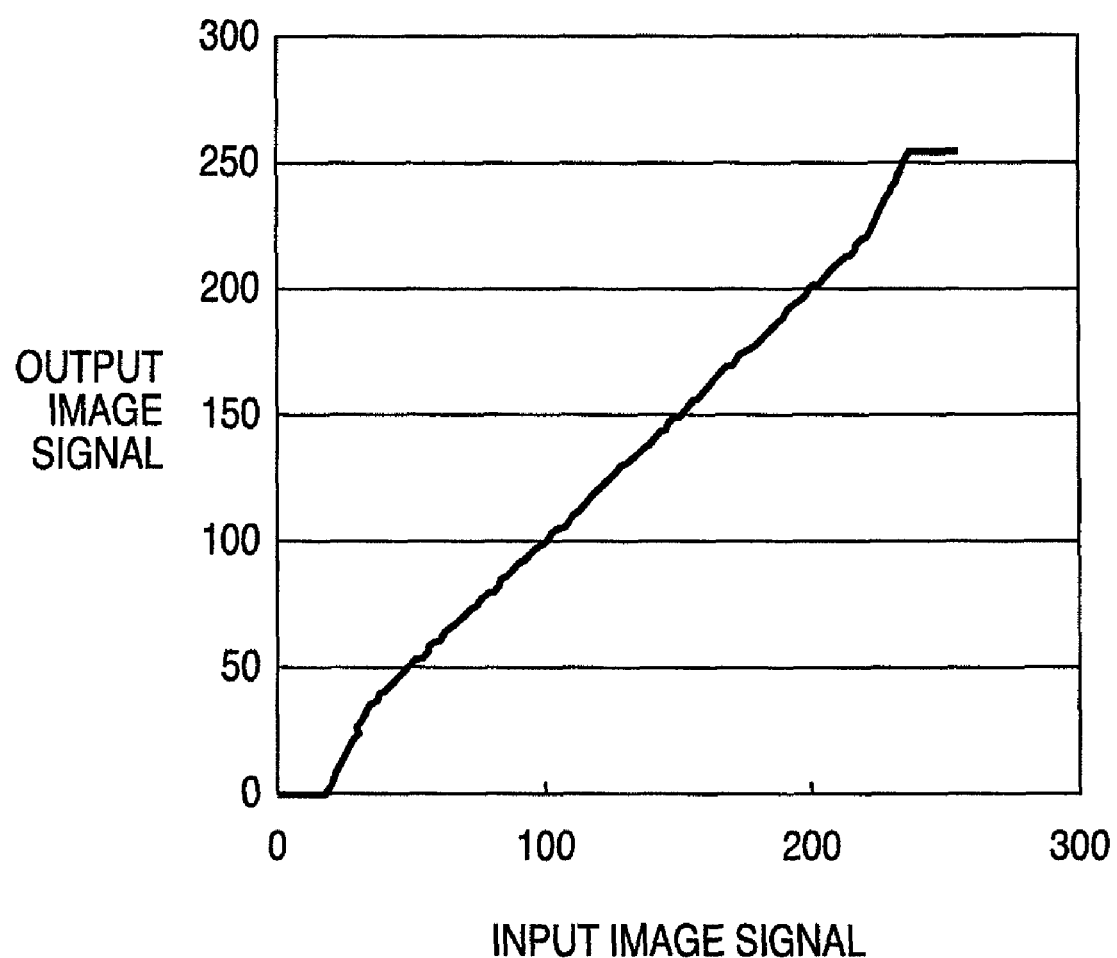
FIG. 31 is an explanatory view of crush in shadows and highlight saturation.

In the description of the first to fourth embodiments, the edge emphasis, smoothing, and achromatization amounts are adaptively adjusted. A case will be exemplified below wherein FIG. 31 is applied to the image signal that has undergone the processes of the first to fourth embodiments. In FIG. 31, the abscissa plots an input image signal value, and the ordinate plots an output image signal value. To calculate the output image signal to have the image signal that has undergone the processes of the first to fourth embodiments as the input image signal of FIG. 31, FIG. 31 can be applied. Assume that FIG. 31 expresses that the image signal in FIG.

31 is darker with decreasing image signal value, and is brighter with increasing image signal value. By applying FIG. 31, an image signal of a black character area can be more blackened, and an image signal of a white background area can be more whitened. With the above process, since the contrast between the text and background areas can be increased, the sharpness of a character can be enhanced. If the image signal in FIG. 31 is expressed by RGB, FIG. 31 may be applied to RGB colors. Alternatively, if the image signal in FIG. 31 is L, FIG. 31 may be applied to L. If the image signal in FIG. 31 is expressed by RGB, input/output curves may be changed for respective colors. The present invention is not limited to the input/output curve in FIG. 31, and the input/output curve may be appropriately defined.

On the other hand, the first to fourth embodiments adaptively determine the adjusting level using the variation time count and variation, and also the variation acceleration and saturation. When the adjusting level is replaced by an image area, this embodiment can adaptively separate image areas in accordance with the variation time count and variation. For example, as the product of Fz and Fe is larger, a pixel which is more likely to belong to a text area can be determined. As the product is smaller, a pixel which is more likely to belong to a halftone or photo area can be determined. In addition, using the variation acceleration and saturation as well, the proximity to the edge center and that to the luminance axis can also be determined, and image areas can be separated more finely.

Other Embodiments

The embodiments of the present invention have been explained in detail. The present invention may be applied to either a system constituted by a plurality of devices, or an apparatus consisting of a single device.

Note that the present invention includes a case wherein the invention is achieved by directly or remotely supplying a program that implements the functions of the aforementioned embodiments to a system or apparatus, and reading out and executing the supplied program code by a computer of that system or apparatus. Therefore, the technical scope of the present invention includes the program code itself installed in a computer to implement the functional processes of the present invention using the computer.

In this case, the form of program is not particularly limited, and an object code, a program to be executed by an interpreter, script data to be supplied to an OS, and the like may be used as long as they have the program function.

As a recording medium for supplying the program, for example, a floppy® disk, hard disk, optical disk, and magneto-optical disk may be used. Also, MO, CD-ROM, CD-R, CD-RW, magnetic tape, nonvolatile memory card, ROM, DVD (DVD-ROM, DVD-R), and the like may be used.

As another use method, a connection is established to the Internet site using a browser of a client PC, and the program itself according to the present invention or a file that further includes an automatic installation function may be downloaded to a recording medium such as a hard disk or the like. Also, the program code that forms the program of the present invention may be segmented into a plurality of files, which may be downloaded from different homepages. That is, the present invention includes a WWW server which makes a plurality of users download a program required to implement the functional processes of the present invention by the computer. Furthermore, a storage medium such as a CD-ROM or the like, which stores the encrypted program of the present invention, may be delivered to the users. The user who has cleared a predetermined condition may be allowed to download key information that decrypts the program from a homepage via the Internet, and the encrypted program may be executed using that key information to be installed on a computer, thus implementing the present invention.

Moreover, the functions of the aforementioned embodiments can be implemented by some or all of actual processes executed by an OS or the like which runs on a computer based on instructions of the program.

In addition, the scope of the present invention includes a case in which the program according to the present invention is written in a memory of a function expansion unit of a PC, and a CPU equipped on that function expansion unit executes some or all of actual processes.

According to the present invention, since the adjusting level can be changed based on the variation and variation time count, bad effects that may be caused by the image adjusting processes can be eliminated, and the image adjusting processes can be executed more accurately to improve the image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-180378, filed on Jun. 29, 2006, which is hereby incorporated by reference herein in its entirety.

What is claimed is:

1. An image processing apparatus, which applies an adjusting process to an image that includes a pixel to be processed, said apparatus comprising:

an extraction unit adapted to extract an image area with a predetermined size including the pixel to be processed;

a variation calculation unit adapted to calculate a variation with respect to the pixel to be processed from signal values of pixels included in the image area;

a variation time count calculation unit adapted to calculate a variation time count with respect to the pixel to be processed from the signal values of the pixels included in the image area;

a definition unit adapted to define correspondence among the variation time count, the variation, and an adjusting level; and an adjusting unit adapted to calculate the adjusting level from the variation time count and the variation using said definition unit, and to apply an adjusting process to a signal value of the pixel to be processed by the calculated adjusting level, wherein said definition unit defines the correspondence so that the adjusting level progressively changes in accordance with different variation time counts or different variations.

2. The apparatus according to claim 1, wherein said definition unit defines the correspondence within at least a part of a value range that the variation time count can assume, so that the adjusting level progressively changes according to the variation time count.

3. The apparatus according to claim 1, wherein said definition unit defines the correspondence within at least a part of a value range that the variation can assume, so that the adjusting level progressively changes according to the variation.

4. The apparatus according to claim 1, wherein when the variation time count is smaller than a first threshold, said definition unit defines the adjusting level to be a maximum value, when the variation time count is larger than a second threshold which is larger than the first threshold, said definition unit defines the adjusting level to be a minimum value, and said definition unit defines so that the adjusting level progressively changes from the maximum value to the minimum value as the variation time count changes from the first threshold to the second threshold.

5. The apparatus according to claim 4, wherein the maximum value and the minimum value have different signs.

6. The apparatus according to claim 1, wherein when the variation is smaller than a third threshold, said definition unit defines the adjusting level to be a minimum value, when the variation is larger than a fourth threshold which is larger than the third threshold, said definition unit defines the adjusting level to be a maximum value, and said definition unit defines so that the adjusting level progressively changes from the minimum value to the maximum value as the variation changes from the third threshold to the fourth threshold.

7. The apparatus according to claim 1, wherein said variation calculation unit calculates the variation from signal values of a plurality of pixels which line up on an edge direction in the image area.

8. The apparatus according to claim 7, wherein said variation calculation unit compares differences between signal values of pixel sequences in a plurality of directions including the pixel to be processed in the image area, and defines a direction with the maximum difference as the edge direction.

9. The apparatus according to claim 1, wherein said variation time count calculation unit calculates the variation time count from signal values of pixels which line up on an edge direction in the image area.

10. The apparatus according to claim 1, wherein said variation calculation unit calculates, as the variation, a maximum absolute value of primary derivatives of signal values of a plurality of pixels, which line up on an edge direction in the image area.

11. The apparatus according to claim 1, wherein said adjusting unit executes, as the adjusting process, at least one of an edge emphasis process, a smoothing process, a substitution process, and an achromatization process, and said definition unit defines, as the adjusting level, at least one of an edge emphasis amount, a smoothing amount, a substitute amount, and an achromatization amount.

12. The apparatus according to claim 1, wherein said definition unit defines correspondence among the variation time count, and a first adjusting level and a second adjusting level, and defines correspondence between the variation and a third adjusting level, said adjusting unit executes a filter process of the pixel to be processed using the first adjusting level, the second adjusting level, and the third adjusting level.

13. The apparatus according to claim 12, wherein when the variation time count is smaller than a fifth threshold, said definition unit defines the first adjusting level to be a maximum value, when the variation time count is larger than a sixth threshold which is larger than the fifth threshold, said definition unit defines the first adjusting level to be a minimum value, said definition unit defines so that the first adjusting level progressively changes from the maximum value to the minimum value as the variation time count changes from the fifth threshold to the sixth threshold, when the variation time count is smaller than a seventh threshold, said definition unit defines the second adjusting level to be a minimum value, when the variation time count is larger than an eighth threshold which is larger than the seventh threshold, said definition unit defines the second adjusting level to be a maximum value, and said definition unit defines so that the second adjusting level progressively changes from the minimum value to the maximum value as the variation time count changes from the seventh threshold to the eighth threshold.

14. The apparatus according to claim 1, further comprising a variation acceleration calculation unit adapted to calculate a variation acceleration associated with the image area from signal values of pixels included in the image area, wherein said definition unit defines correspondence between the variation acceleration and a fourth adjusting level, said definition unit defines correspondence between the variation time count and a fifth adjusting level, said definition unit defines correspondence between the variation and a sixth adjusting level, and said adjusting unit executes a substitution process of the pixel to be processed using the fourth adjusting level, the fifth adjusting level, and the sixth adjusting level.

15. The apparatus according to claim 14, wherein when the variation acceleration is smaller than a ninth threshold, said definition unit defines the fourth adjusting level to be a minimum value, when the variation acceleration is larger than a 10th threshold which is larger than the ninth threshold, said definition unit defines the fourth adjusting level to be a maximum value, and said definition unit defines so that the fourth adjusting level progressively changes from the minimum value to the maximum value as the variation acceleration changes from the ninth threshold to the 10th threshold.

16. The apparatus according to claim 1, further comprising a saturation calculation unit adapted to calculate a saturation associated with the image area from signal values of pixels included in the image area, wherein said definition unit defines correspondence between the saturation and a seventh adjusting level, said definition unit defines correspondence between the variation time count and an eighth adjusting level, said definition unit defines correspondence between the variation and a ninth adjusting level, and said adjusting unit executes a substitution process of the pixel to be processed using the seventh adjusting level, the eighth adjusting level, and the ninth adjusting level.

17. The apparatus according to claim 16, wherein when the saturation is smaller than an 11th threshold, said definition unit defines the seventh adjusting level to be a maximum value, when the saturation is larger than a 12th threshold which is larger than the 11th threshold, said definition unit defines the seventh adjusting level to be a minimum value, and said definition unit defines so that the seventh adjusting level progressively changes from the maximum value to the minimum value as the saturation changes from the 11th threshold to the 12th threshold.

18. An image processing method, which applies an adjusting process to an image that includes a pixel to be processed, said method comprising the steps of:

using an extracting unit to extract an image area with a predetermined size including the pixel to be processed;

using a variation calculating unit to calculate a variation with respect to the pixel to be processed from signal values of pixels included in the image area;

using a variation time count calculating unit to calculate a variation time count with respect to the pixel to be processed from the signal values of the pixels included in the image area; and using an adjusting level calculating unit to calculate an adjusting level from the variation time count and the variation using a definition unit which defines correspondence among the variation time count, the variation, and the adjusting level, and applying an adjusting process to a signal value of the pixel to be processed by the calculated adjusting level, wherein the definition unit defines the correspondence so that the adjusting level progressively changes in accordance with different variation time counts or different variations.

19. A non-transitory computer-readable storage medium storing an image processing program, which causes an image processing apparatus to apply an adjusting process to an image that includes a pixel to be processed, the image processing apparatus executing the image processing program to implement the steps of:

extracting an image area with a predetermined size including the pixel to be processed;

calculating a variation with respect to the pixel to be processed from signal values of pixels included in the image area;

calculating a variation time count with respect to the pixel to be processed from the signal values of the pixels included in the image area; and calculating an adjusting level from the variation time count and the variation using a definition unit which defines correspondence among the variation time count, the variation, and the adjusting level, and applying an adjusting process to a signal value of the pixel to be processed by the calculated adjusting level, wherein the definition unit defines the correspondence so that the adjusting level progressively changes in accordance with different variation time counts or different variations.

* * * * *